(12) United States Patent
Baxley et al.

(10) Patent No.: US 8,098,713 B2
(45) Date of Patent: Jan. 17, 2012

(54) METHODS AND APPARATUS FOR GENERATING AND COMMUNICATING WIRELESS SIGNALS HAVING PILOT SIGNALS WITH VARIABLE PILOT SIGNAL PARAMETERS

(75) Inventors: Robert John Baxley, Atlanta, GA (US); John Eric Kleider, Atlanta, GA (US); Kelly Anderson, Gilbert, AZ (US)

(73) Assignee: General Dynamics C4 Systems, Scottsdale, AZ (US)

( * ) Notice: Subject to any disclaimer, the term of this patent is extended or adjusted under 35 U.S.C. 154(b) by 803 days.

(21) Appl. No.: 12/102,677

(22) Filed: Apr. 14, 2008

(65) Prior Publication Data

US 2009/0052561 A1  Feb. 26, 2009

Related U.S. Application Data

(60) Provisional application No. 60/911,787, filed on Apr. 13, 2007.

(51) Int. Cl.
*H04B 1/00* (2006.01)
(52) U.S. Cl. ........ 375/145; 375/146; 375/149; 375/364; 370/500; 370/510
(58) Field of Classification Search ........... 375/145, 375/146, 149, 354, 364, 365, 366; 370/500, 370/510, 513, 514
See application file for complete search history.

(56) References Cited

U.S. PATENT DOCUMENTS

| | | | |
|---|---|---|---|
| 5,867,478 A | 2/1999 | Baum et al. | |
| 6,314,146 B1 | 11/2001 | Tellado et al. | |
| 6,369,758 B1 | 4/2002 | Zhang | |
| 6,411,610 B1 | 6/2002 | Li et al. | |
| 6,473,467 B1 | 10/2002 | Wallace et al. | |
| 6,487,252 B1 | 11/2002 | Kleider et al. | |
| 6,549,561 B2 | 4/2003 | Crawford | |
| 6,549,583 B2 | 4/2003 | Crawford | |
| 6,567,374 B1 | 5/2003 | Böhnke et al. | |
| 6,628,735 B1 | 9/2003 | Belotserkovsky et al. | |
| 6,633,616 B2 | 10/2003 | Crawford | |
| 6,700,866 B1 | 3/2004 | Heinonen et al. | |
| 6,757,299 B1 | 6/2004 | Verma | |

(Continued)

OTHER PUBLICATIONS

J. K. Cavers, "An Analysis of Pilot Symbol Assisted Modulation for Rayleigh Fading Channels," IEEE Transactions on Vehicular Technology, vol. 40, No. 4, pp. 686-693, Dec. 1991.

(Continued)

*Primary Examiner* — Dac Ha
(74) *Attorney, Agent, or Firm* — Ingrassia Fisher & Lorenz, P.C.

(57) ABSTRACT

An embodiment for wirelessly communicating a signal includes a transmitter generating and transmitting a wireless signal over a wireless communication channel. The wireless signal includes a guard band, data represented within a plurality of data-bearing subcarriers, and a plurality of pilot signals represented within a plurality of pilot subcarriers. In an embodiment, the plurality of pilot signals have variable pilot signal parameters selected from a group of parameters that includes pilot power and pilot spacing with respect to adjacent pilots. An embodiment further includes a receiver receiving a channel-affected version of the wireless signal, and producing a corrected signal by applying corrections to the received signal based on estimated channel perturbations within the received signal, where the estimated channel perturbations are determined based on the plurality of pilot signals. The receiver also produces an output data symbol from the corrected signal.

28 Claims, 13 Drawing Sheets

U.S. PATENT DOCUMENTS

| | | | |
|---|---|---|---|
| 6,853,632 B1 | 2/2005 | Verma et al. | |
| 6,928,062 B2 | 8/2005 | Krishnan et al. | |
| 6,985,535 B2 | 1/2006 | Park et al. | |
| 7,027,464 B1 | 4/2006 | Nakahara et al. | |
| 7,042,857 B2 | 5/2006 | Krishnan et al. | |
| 7,164,649 B2 | 1/2007 | Walton et al. | |
| 7,190,734 B2 | 3/2007 | Giannakis et al. | |
| 7,206,606 B2 | 4/2007 | Kobayashi et al. | |
| 7,233,625 B2 | 6/2007 | Ma et al. | |
| 7,269,430 B2 | 9/2007 | Moorti et al. | |
| 7,289,588 B2 | 10/2007 | Suh et al. | |
| 7,317,750 B2 | 1/2008 | Shattil | |
| 7,324,605 B2 | 1/2008 | Maltsev et al. | |
| 7,359,311 B1 | 4/2008 | Paranjpe et al. | |
| 7,403,570 B2 | 7/2008 | Ma et al. | |
| 7,406,261 B2 | 7/2008 | Shattil | |
| 7,471,728 B2 * | 12/2008 | Brutel et al. | 375/260 |
| 7,590,171 B2 * | 9/2009 | Chang et al. | 375/227 |
| 7,688,907 B2 * | 3/2010 | Dang | 375/260 |
| 7,764,593 B2 * | 7/2010 | Kim et al. | 370/208 |
| 7,881,181 B2 | 2/2011 | Dapper et al. | |
| 2005/0043052 A1 * | 2/2005 | Whinnett et al. | 455/522 |
| 2005/0105505 A1 | 5/2005 | Fishler et al. | |
| 2005/0135503 A1 | 6/2005 | Talwar et al. | |
| 2005/0157814 A1 | 7/2005 | Cova et al. | |
| 2006/0018250 A1 * | 1/2006 | Gu et al. | 370/208 |
| 2006/0239233 A1 | 10/2006 | Hanada et al. | |
| 2006/0250936 A1 | 11/2006 | Chen et al. | |
| 2006/0291431 A1 | 12/2006 | Pajukoski et al. | |
| 2007/0089015 A1 | 4/2007 | Saul | |
| 2007/0098100 A1 | 5/2007 | Charbit et al. | |
| 2007/0211835 A1 | 9/2007 | Inagawa et al. | |
| 2007/0253472 A1 | 11/2007 | Jang | |
| 2008/0075195 A1 | 3/2008 | Pajukoski et al. | |
| 2008/0095263 A1 | 4/2008 | Xu et al. | |
| 2008/0117995 A1 * | 5/2008 | Anderson et al. | 375/260 |
| 2009/0003308 A1 | 1/2009 | Baxley et al. | |
| 2009/0011722 A1 | 1/2009 | Kleider et al. | |
| 2010/0002784 A1 | 1/2010 | Hlinka et al. | |
| 2010/0029310 A1 | 2/2010 | Li et al. | |
| 2010/0195609 A1 * | 8/2010 | Li et al. | 370/329 |

OTHER PUBLICATIONS

"IEEE Standard Local and Metropolitan Area Network," IEEE Std. 802.16a, Jan. 2003.

R. Negi et al., "Pilot Tone Selection for Channel Estimation in a Mobile OFDM System," IEEE Transactions on Consumer Electronics, vol. 44, pp. 1122-1128, Aug. 1998.

M. Orelli et al., "A Comparison of Pilot-Aided Channel Estimation Methods for OFDM Systems," IEEE Trans. on Signaling Processing, vol. 49, No. 12, pp. 3065-3073, 2001.

J. E. Kleider et al., "Preamble and Embedded Synchronization for RF Carrier Frequency-Hopped OFDM," IEEE Journal on Selected Areas in Communications, vol. 23, No. 5, pp. 920-931, May 2005.

J. Tellado, "Peak to Average Power Reduction for Multicarrier Modulation," Dissertation submitted to the Dept. of Electrical Engineering, Sep. 1999.

R. W. Bauml et al., "Reducing the Peak-to-Average Power Ratio to Multicarrier Modulation by Selected Mapping," Electronics Letters, vol. 32, pp. 2056-2057, Oct. 1996.

S. O'Hara, B. Chen et al., "A Bandwidth Efficient Peak Power Reduction Scheme for Multicarrier Modulation Using Selected Mapping," Proc. Conference on Information Sciences and Systems, Mar. 2003.

R. J. Baxley et al., "Magnitude-Scaled Selected Mapping: A Crest Factor Reduction Scheme for OFDM Without Side-Information Transmission," Proc. IEEE Intl. Conference on Acoustics, Speech, and Signal Processing, Apr. 2007.

A. D. S. Jayalath et al., "SLM and PTS Peak-Power Reduction of OFDM Signals Without Side Information," IEEE Transactions on Wireless Communications, vol. 4, pp. 2006-2013, Sep. 2005.

R. J. Baxley et al., "MAP Metric for Blind Phase Sequence Detection in Selected Mapping," IEEE Transactions on Broadcasting, vol. 51, pp. 565-570, Dec. 2005.

N. Chen et al., "Peak-to-Average Power Ratio Reduction in OFDM with Blind Selected Pilot Tone Modulation," IEEE Transactions on Wireless Communications, vol. 5, pp. 2210-2216, Aug. 2006.

F. Tufvesson et al., "Time and Frequency Synchronization for OFDM Using PN-Sequence Preambles," Proc. IEEE Vehicular Technology Conference, (Amsterdam, Netherlands), pp. 2203-2207, Sep. 1999.

N. Chen et al., "Superimposed Training for OFDM: A Peak-to-Average Power Ratio Analysis," IEEE Transactions on Signal Processing, vol. 54, pp. 2277-2287, Jun. 2006.

R. J. Baxley et al., "Embedded Synchronization/Pilot Sequence Creation Using POCS," Proc. IEEE International Conference on Acoustics, Speech and Signal Processing, 2006., pp. 321-324, May 2006.

R. J. Baxley et al., "Pilot Design for IEEE 802.16 OFDM and OFDMA," in Proc. IEEE International Conference on Acoustics, Speech and Signal Processing, Apr. 2007.

Z. Wang et al., "Wireless Multicarrier Communications," IEEE Signal Processing Magazine, vol. 17, pp. 29-48, May 2000.

X. Cai et al., "Error Probability Minimizing Pilots for OFDM with m-PSK Modulation Over Rayleigh-Fading Channels," IEEE Transactions on Vehicular Technology, vol. 53, pp. 146-155, Jan. 2004.

E. Larsson et al., "Preamble Design for Multiple-Antenna OFDM-Based WLANs with Null Subcarriers," IEEE Signal Processing Letters, vol. 8, pp. 285-288, Nov. 2001.

M. Dong et al., "Optimal Pilot Placement for Channel Tracking in OFDM," Proc. Military Communications Conference 2002, pp. 602-606, Nov. 2002.

M. Dong et al., "Optimal Design and Placement of Pilot Symbols for Channel Estimation," IEEE Transactions on Signal Processing, vol. 50, No. 12, pp. 3055-3069, Dec. 2002.

L. Tong et al., "Pilot-Assisted Wireless Transmissions: General Model, Design Criteria, and Signal Processing," IEEE Signal Processing Magazine, vol. 21, pp. 12-25, Nov. 2004.

X. Cai et al., "Adaptive PSAM Accounting for Channel Estimation and Prediction Errors," IEEE Transactions on Wireless Communications, vol. 4, pp. 246-256, Feb. 2005.

J. Diaz et al., "Impact of Imperfect Channel State Information Upon the Outage Capacity of Rayleigh Fading Channels," Proc. IEEE Global Telecommunications Conference, 2004, pp. 887-892, Dec. 2004.

R. You et al., "Diversity Combining with Imperfect Channel Estimation," IEEE Transactions on Communications, vol. 53, pp. 1655-1662, Oct. 2005.

T. Weber et al., "Imperfect Channel-State Information in MIMO Transmission," IEEE Transactions on Communications, vol. 54, pp. 543-552, Mar. 2006.

S. Kay, Fundamentals of Statistical Signal Processing, vol. 1: Estimation Theory. Englewood Cliffs, NJ: Prentice-Hall, pp. 521-523, Jan. 1993.

S. Chennakeshu et al., "Error Rates for Rayleigh Fading Multichannel Reception of MPSK Signals," IEEE Transactions on Communications, vol. 43, pp. 338-346, Feb., Mar., Apr. 1995.

J. Proakis, Digital Communications, New York, NY: McGraw-Hill, p. 817, Jan. 2001.

S. Boyd et al.E, Convex Optimization. Cambridge University Press, Jan. 2004.

"Lagrange Multipliers," http://en.wikipedia.org/wiki/Lagrange_multipliers, retrieved on Jan. 11, 2007.

J. Tellado et al., "PAR Reduction in Multicarrier Transmission Systems," Feb. 1998.

Alamouti, S. "A simple transmit diversity technique for wireless communications," IEEE JSAC, vol. 16, No. 8, Oct. 1998, pp. 1451-1458.

Anderson, K., et al. "Two dimensional diversity enhancement for tactical wireless networks using multi-carrier cooperative networking," in proceedings of SDR Forum Technical Conference 2006.

Baxley, R.J., et al. "A method for joint peak-to-average power radio reduction and synchronization in OFDM," accepted MILCOM, Orlando, FL, Oct. 2007.

Baxley, R.J., et al. "Pilot design for OFDM with null edge subcarriers," IEEE Trans. Wireless Communcations, vol. 8, No. 1, pp. 396-405, Jan. 2009.

Cao, Z., et al. "Frequency synchronization fro generalized OFDMA uplink," in Proc. IEEE Globecomm, 2004.

Choi, J., et al. "Carrier frequency offset compensation for uplink of OFDM-FDAM systems," IEEE Trans. Commun., 2005.

Cui, T., et al. "Joint frequency offset and channel estimation for OFDM," in Proc. Globecom, vol. 1, pp. 15-19, Dec. 2006.

Dai, H. "Distributed versus co-located MIMO systems with correlated fading and shadowing," in Proc. of ICASSP, vol. IV, May 2006, pp. 561-564.

Fechtel, S. "OFDM carrier and sampling frequency syncronization and its performance on stationary and mobile channels," IEEE Trans Cons. Elect., vol. 46, No. 3, Aug. 2000.

Gault, S., et al. "Joint sampling clock offset and channel estimation for OFDM Signals: Cramer-Rao bound and algorithms," IEEE Trans. Signal Proc., vol. 54, No. 5, pp. 1875-1885, May 2006.

Ghogho, M., et al. "Semi-blind frequency offset synchronization for OFDM," in Proc. ICASSP, vol. 3, pp. 2333-2336, May 2002.

Giannakis, G., et al. Space-Time Coding for Broadband Wireless Communications, John Wiley and Sons, Hoboken, NJ, 2007. www.researchandmarkets.com/reports/449857.

Goldsmith, A., et al. "Capacity limits of MIMO channels," IEEE, JSAC, vol. 21, No. 5, Jun. 2003, pp. 684-702.

Huang, D., et al. "An Interference cancellation scheme for carrier frequency offsets correction in OFDMA systems," IEEE Trans. Commun., 2005.

Jayalath, A.D.S., et al. Blind SLM receiver for PAR-reduced OFDM, PRoc. IEEE Vehicular Technology Conference, pp. 219-222, Sep. 2002.

Kleider, J., et al. "Timing synchronization in distributed mobile MISO rayleigh fading channels," in Proc. MILCOM, pp. 1-7, Oct. 2007.

Kleider, J., et al. "MISO joint synchronization-pilot design for OFDM systems," in Proc. ICASSP, pp. 3033-3036, Mar.-Apr. 2008.

Le, H.N., et al. "Joint channel estimation and synchronization for MIMO-OFDM in the presence of carrier and sampling frequency offsets," IEEE Trans. on Vehicular Technology, vol. 58, No. 6, Jul. 2009.

Li, X. "Space0time coded multi-transmission among distributed transmitters without perfect synchronization," IEEE Signal Processing Letters, vol. 11, No. 12, Dec. 2004, 948-951.

Lu, B., et al. "Iterative receivers for space-time block-coded OFDM systems in dispersive fading channels," IEEE Trans. On Commun., vol. 53, No. 1, pp. 162-172, Jan. 2005.

Ma, X., et al. "Joint frequency offset and channel estimation for OFDM," in Proc. Globecom, vol. 1, pp. 15-19, Dec. 2006.

Ma, X., et al. "Hopping pilots for estimation of frequency offset and multiantenna channels in MIMO-OFDM," IEEE Trans. On Commun., vol. 1, No. 2, pp. 213-225, Apr. 2002.

Ma, Q., et al. "Differential space-time-frequency coded OFDM with maximum multipath diversity," IEEE Trans. Wireless Commun., vol. 4, No. 5, pp. 2232-2243, Sep. 2005.

Ohno, S. "Preamble and pilot symbol design for channel estimation in FDM," in Proc. ICASSP, vol. 3, pp. 281-284, Apr. 2007.

Pun, M.O., et al. "Iterative detection and frequcny synchronization for OFDMA uplink transmissions," in IEEE Trans. Wireless Commun., Feb. 2007.

Schmidl, T.M., et al. "Robust frequency and timing synchronization for ODFM," IEEE Trans on Commun., vol. 45, No. 12, pp. 1613-1621, Dec. 1997.

Tonello, A. "Multiuser detection and turbo multiuser decoding for asynchronous multitone multiple access," in Proc. IEEE Veh. Techn. Conf., 2002.

van Zelst, A., et al. "Implementation of a MIMO-OFDM-based wireless LAN system," IEEE Trans. Signal PRoc., vol. 52, No. 2, pp. 483-494, Feb. 2004.

U.S. Office Action issued Jun. 24, 2011 in U.S. Appl. No. 12/083,983.

U.S. Office Action for U.S. Appl. No. 12/051,535 mailed Mar. 15, 2011.

\* cited by examiner

METHODS AND APPARATUS FOR GENERATING AND COMMUNICATING WIRELESS SIGNALS HAVING PILOT SIGNALS WITH VARIABLE PILOT SIGNAL PARAMETERS

CROSS-REFERENCE TO RELATED APPLICATION

This application claims the benefit of U.S. Provisional Application No. 60/911,787, filed Apr. 13, 2007.

GOVERNMENT LICENSE RIGHTS

The U.S. Government may have certain rights to some or all of the inventive subject matter of the present application as provided for by the terms of contract No. DAAD19-01-2-0011 awarded by Army Research Laboratory.

TECHNICAL FIELD

The inventive subject matter generally relates to methods and apparatus for wirelessly communicating signals, and more particularly to methods and apparatus for generating and wirelessly communicating signals that include pilot signals with variable pilot signal parameters.

BACKGROUND

Orthogonal frequency division multiplexing (OFDM) is a modulation method used in traditional, high-speed wireless networks. However, waveforms generated using traditional OFDM techniques exhibit noise-like properties, and thus OFDM waveforms tend to suffer from relatively large peak-to-average ratios (PARs), which in turn may lead to significant distortion noise and low power efficiency in peak-limited channels. In addition, under relatively harsh channel conditions, transmitted OFDM signals tend to incur significant timing offsets and carrier frequency offsets. Because traditional OFDM techniques tend not to be robust under harsh channel conditions, significant timing offsets may result in inter-block interference, and significant carrier frequency offsets may result in inter-carrier interference. Both of these forms of interference are detrimental to the bit error rates and/or symbol error rates of received signals.

In order to estimate the channel and to address timing and carrier frequency offsets, some traditional OFDM devices transmit a preamble in conjunction with and preceding an information-bearing OFDM sequence. The receiver may perform a conjugate correlation of the received preamble and an expected preamble to determine estimates for the timing and carrier frequency offsets. In addition, when the preamble also includes channel training information, the preamble also may be used to perform channel estimation. Although transmission of a preamble is relatively simple to implement, a tradeoff to implementing this technique is that a significant amount of bandwidth is used solely for preamble transmission, and thus for synchronization, acquisition, and, when channel training information is available, also for channel estimation.

In addition, the channel estimate naturally has some error, when compared with actual channel conditions. Traditional OFDM transmission methods may experience an increase in channel estimation errors on the receiver side, which may result from non-linear amplification, by a power amplifier device on the transmitter side, of transmit information sequences having higher than desired PARs. Such non-linear transmission may cause significant out-of-band interference (i.e., interference outside the signal bandwidth, such as in the adjacent channels and/or other user channels), and also may induce undesired in-band interference, which adds distortion to the transmitted information bits and also to the channel training information. Furthermore, improper synthesis of the channel training information may lead to further channel estimation errors at the receiver. Thus, non-linear amplification of high peak-to-average power ratio signals and improper channel training information design may, in the receiver, result in unacceptably high channel estimation errors and excessively high bit error rates.

In some OFDM systems, pilot symbol assisted modulation (PSAM) techniques are used to estimate multipath channels and remove their effects from a received OFDM symbol. Using PSAM, a data component of a transmit signal is modulated onto a plurality of data-bearing subcarriers within an available frequency band, and pilot signals (referred to simply as "pilots" herein) are modulated onto a plurality of non-overlapping pilot subcarriers, where each subcarrier may be indicated by a subcarrier index. In some systems, "guard bands" consisting of a plurality of "null edge" subcarriers are designated at the lower and upper edges of the frequency band. The power contained in the null edge subcarriers is essentially zero, which has the effect of limiting the amount of spectral regrowth that may encroach on neighboring channels.

Traditional pilot signal designs include evenly-spaced, constant-power pilots, meaning that the number of data-bearing subcarriers between sets of adjacent pilot subcarriers is equal, and the power contained in each pilot is substantially equal. Evenly-spaced, constant-power pilots have assisted in achieving adequate system performance in many OFDM systems. However, in systems in which the width of the guard band interferes with the ability to provide evenly-spaced pilots across neighboring channel boundaries (e.g., discontinuities in the even spacing occur across the guard bands), non-optimal results have been observed. More particularly, even though implementation of PSAM techniques may improve channel estimation performance and symbol error rate (SER) performance, performance improvements may be worse in systems that include a guard band when compared with systems that do not. However, inclusion of the guard band may be desirable in order to limit the amount of spectral regrowth that may encroach on neighboring channels, as mentioned above.

Accordingly, for systems in which null edge subcarriers and pilot subcarriers are allocated within a signal's frequency spectrum (e.g., systems in which a guard band is used along with PSAM), what are needed are methods and apparatus for generating and communicating signals with improved channel estimation and/or SER performance over traditional techniques. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

Figure 1:
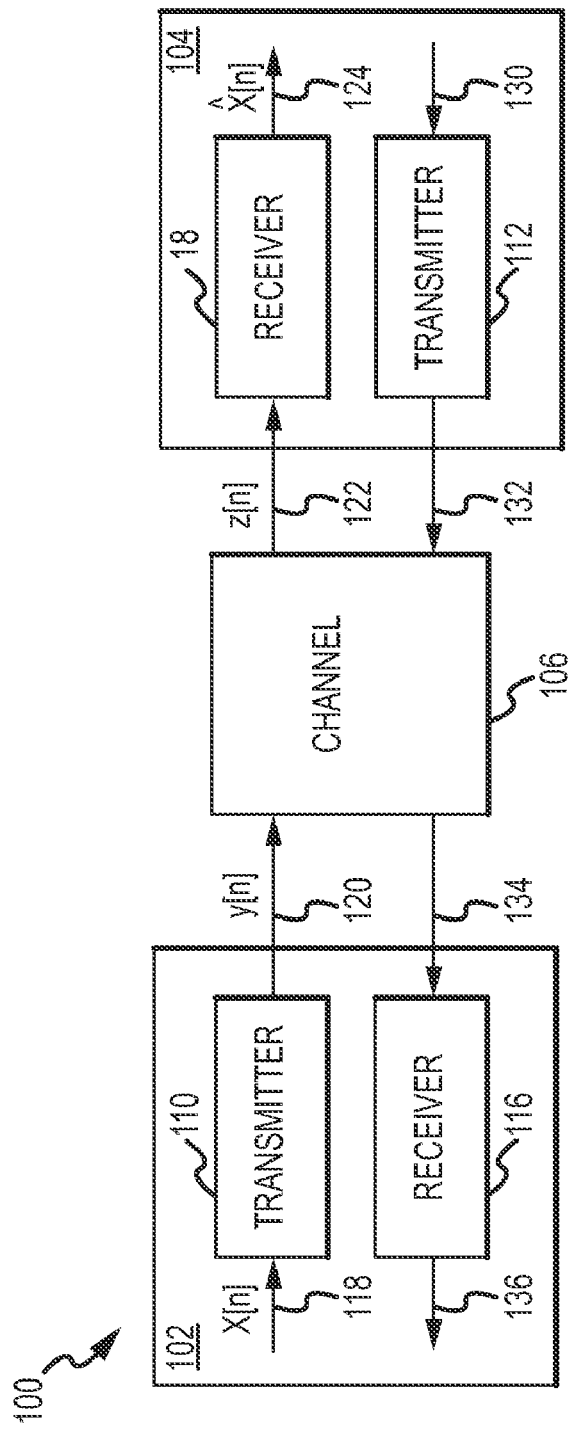
FIG. 1 is a simplified block diagram of a multi-carrier communication system that includes multiple wireless communication devices that communicate over a wireless communication channel, in accordance with an example embodiment.

The following detailed description of the inventive subject matter is merely exemplary in nature and is not intended to limit the inventive subject matter or the application and uses of the inventive subject matter. Furthermore, there is no intention to be bound by any theory presented in the following detailed description.

Embodiments include methods and apparatus for generating and wirelessly communicating signals in systems in which null edge subcarriers (e.g., guard bands) and pilot symbol assisted modulation (PSAM) are implemented. A signal communicated according to an embodiment includes a plurality of pilot signals that have variable pilot signal parameters. The term "variable pilot signal parameters," as used herein, means that one or more of the plurality of pilot signals being transmitted has one or more different pilot signal parameters when compared with the pilot signal parameters for one or more other pilot signals being transmitted. In an embodiment, pilot signal parameters include parameters within a group that includes pilot power and pilot spacing with respect to adjacent pilots. In a particular embodiment, variable pilot signal parameters are determined using a cubic parameterization of the pilot subcarriers in conjunction with a convex optimization algorithm to produce pilot designs that may have near-optimal channel estimate mean square error (MSE) performance.

As used herein, the term "unevenly-spaced" means that the number of non-pilot subcarriers between at least one pair of adjacent pilot signals is substantially different from the number of non-pilot subcarriers between at least one other pair of adjacent pilot signals in the plurality of pilot signals, where the term "substantially different" in this context means at least ±1 different from. In contrast, the term "evenly-spaced" means that the number of non-pilot subcarriers between each pair of adjacent pilot signals is the same, in the in-band region, for each pair of adjacent pilot signals in the plurality of pilot signals, where the "in-band" region means the portion of a channel between the null edge subcarriers (e.g., the data-bearing portion of the channel or the non null-edge subcarrier region). As used herein, the term "unequal power" means that the power contained within one or more of the pilot signals in the plurality of pilot signals is substantially different from the power contained within one or more other pilot signals in the plurality of power signals, wherein the term "substantially different" means having a value that is at least 5% greater than or less than another value. In contrast, the term "substantially equal" means that each pilot signal of the plurality of pilot signals contains substantially the same power, wherein the term "substantially the same" means having values that fall within a range of 0% to 5%.

In another embodiment, pilots are positioned at pilot subcarriers that are unevenly-spaced, although they may have substantially equal power. A signal communicated according to yet another embodiment includes a plurality of pilot signals that have unequal power, although they may be evenly-spaced.

A signal communicated according to still further embodiments includes an embedded synchronization sequence and a plurality of pilot signals that are unevenly-spaced and/or have unequal power. The embedded synchronization sequence and the plurality of pilot signals may be combined into an embedded synchronization/pilot sequence (SPS), in an embodiment. A plurality of SPS may be available to a transmitter for embedding within a signal, and a same plurality of SPS may be available to a receiver for retrieving the data-bearing portion of the signal. Embodiments discussed below refer to combining an SPS with a signal or embedding an SPS within a signal. It is to be understood that, in other embodiments, pilot signals and synchronization sequences may be combined with or embedded within a signal separately, rather than combining or embedding them as an SPS, which includes both. In addition, embodiments discussed below refer to scaling an SPS, and it is to be further understood that, in other embodiments, pilot signals and synchronization sequences may be scaled separately (or not scaled at all), rather than scaling them together within an SPS. For purposes of brevity and conciseness, SPS are described in accordance with various embodiments below. As used herein, the acronym "SPS" may indicate a single synchronization/pilot sequence or multiple synchronization/pilot sequences. For example, the term "set of SPS" means a set of multiple synchronization/pilot sequences. Each of these embodiments will be discussed in detail below.

The following notations apply to the below description. Upper case and lower case bold faced letters represent matrices and column vectors, respectively; $X^T$ and $X^H$ stand for the transpose and the Hermitian transpose of X, respectively; $E[\bullet]$ is the expectation operator; $\|x\|_n$ is the $\ell^n$norm of x; $|x|$ is a vector that is the element-wise magnitude of x; $A^+=(A^H A)^{-1} A^H$ is the pseudoinverse of matrix A; $|A|$ is the cardinality of set A; $((\bullet))_N$ is the modulo N operation; int($\bullet$) rounds the argument to the nearest integer; $D_x$ is a diagonal matrix with vector x on the diagonal; and the N×N discrete Fourier transform (DFT) matrix is denoted by $[Q]_{k,n}=N^{-1/2}\exp(-j2\pi(n-1)(k-1)/N)$.

Embodiments include methods for determining variable pilot signal parameters and for generating and communicating signals that include pilots conforming to those parameters. These embodiments may have one or more significant advantages over traditional techniques. For example, embodiments may have improved channel estimation and/or SER performance over traditional techniques. In addition, embodiments may jointly provide for robust synchronization, low peak-to-average ratios (PARs), and accurate channel estimation, among other things. Signals generated according to various embodiments may have synchronization properties (e.g., compensation for timing offsets and frequency offsets) that are comparable to and potentially better than for signals generated using traditional techniques. In addition, low PARs may be achieved because embodiments may enable a transmitter's power amplifier to be operated more efficiently. In addition to the above advantages, embodiments may result in increased link ranges, because signals may be transmitted using lower power, and correspondingly may be less susceptible to detection. Conversely, embodiments may result in higher link margins, as it may be possible to transmit higher-power signals using a given power amplifier, when compared to traditional techniques that utilize non-constant envelope transmissions. In addition, for battery-powered apparatus, improved battery life may be achieved, because the power amplifier may be operated at a higher efficiency than using traditional techniques.

Embodiments may be utilized in various types of systems. For example, embodiments may be utilized in a variety of multi-carrier communication systems, single-carrier communication systems, spread spectrum communication systems, and/or wireline communication systems in which PSAM is employed. Although embodiments discussed in detail below may pertain to a multi-carrier communication system, or more particularly to an orthogonal frequency division multiplexing (OFDM) system or an orthogonal frequency division multiple access (OFDMA) system, it is to be understood that other embodiments may apply to other types of systems, as well. Embodiments include embedded synchronization methods and apparatus that are employed in a selected mapping (SLM) system, and accordingly such embodiments may be referred to herein as SPS-SLM. Embodiments of SLM systems will be described in more detail later. It is to be understood that other embodiments may apply to systems in which selected mapping techniques are not employed.

FIG. 1 is a simplified block diagram of a multi-carrier communication system 100 that includes multiple wireless communication devices 102, 104 that communicate over a wireless communication channel 106, in accordance with an example embodiment. Multi-carrier communication system 100 may be, for example but not by way of limitation, a currently existing or future multi-carrier based, ultra-wideband system, an OFDM system, an OFDMA system, a multi-carrier code division multiple access (MC-CDMA) system, a wideband code division multiple access (W-CDMA) system, a wireless local area network (WLAN), a digital video broadcast (DVB) system, a digital audio broadcast (DAB) system, a broadband radio access network (BRAN), a WiMAX (Worldwide Interoperability for Microwave Access) system, a single-input single-output (SISO) system, a multiple-input multiple output (MIMO) system, a single-input multiple-output (SIMO) system, a multiple-input single-output (MISO) system, other wideband wireless transmission techniques in which frequency-selective fading may be present, and/or a number of other types of multi-carrier communication systems. System 100 may communicate based on proprietary, existing, and/or emerging standards or protocols, such as, for example but not by way of limitation, an IEEE (Institute of Electrical and Electronics Engineers) 802.16 standard (WiMAX, MIMO-WiMAX (Multiple-Input, Multiple-Output WiMAX)), an IEEE 802.11a, g, and/or n standard (WLAN, MIMO-WLAN), an ETSI (European Telecommunications Standards Institute) BRAN HiperLAN 2 standard, a DVB standard, a DVB-T (DVB Terrestrial) standard, a DAB standard, a WLAN standard, WNW (Wideband Networking Waveform) standard, a MIMO-OFDM standard, and/or other standards or proprietary protocols.

Wireless communication devices 102, 104 may include, for example but not by way of limitation, a device selected from a group of devices comprising a cellular telephone, a radio, a one-way or two-way pager, a personal data assistant, a computer (e.g., a laptop or desktop computer), a base station, an unmanned autonomous vehicle, a wireless transmitter, and/or a wireless transceiver. Embodiments may be implemented in wireless communication devices 102, 104 that include both a transmitter 110, 112 and a receiver 114, 116 (e.g., each device 102, 104 includes a transceiver). In such embodiments, system 100 may provide for two-way communications between devices 102, 104. For example, transmitter 110 in a first device 102 may receive an input data symbol 118, X[n], and may generate and transmit, over channel 106, a wireless signal 120, y[n], which represents the input data symbol 118. Receiver 114 in a second device 104 may receive a channel-affected version 122, z[n], of the wireless signal 120, and may generate an output data symbol 124, $\hat{X}$[n], representing an estimate of the input data symbol 118. Additionally, transmitter 112 in the second device 104 may receive another input data symbol 130, and may generate and transmit, over channel 106, a wireless signal 132 representing the input data symbol. Receiver 116 in the first device 102 may receive a channel-affected version 134 of the wireless signal 132, and may generate an output data symbol 136 representing an estimate of the input data symbol 130. In other embodiments, system 100 may provide for one-way communications. For example, one device may include a transmitter (and no receiver) and another device may include a receiver (and no transmitter). In order to more clearly and simply describe the various embodiments, only one-way communications between a transmitter 110 in a first device 102 and a receiver 114 in a second device 104 is described in detail in the remainder of this description. It is to be understood that the various embodiments also apply to two-way communications as well.

Functionality of transmitter 110 and receiver 114, are described only briefly in conjunction with the description of FIG. 1. More detailed descriptions of the details of various transmitter and receiver embodiments are included later, in conjunction with FIGS. 3-7. Briefly, transmitter 110 is adapted to apply multiple phase shifts to an input data symbol 118, and to combine a plurality of SPS with the phase shifted input data in order to produce a plurality of candidate signals. Embodiments of methods for determining pilot signal parameters will be described in more detail later in conjunction with FIG. 7. First and second scaling factors may be applied to the input data symbol and to the plurality of SPS, respectively, prior to combining the phase shifted input data and the plurality of SPS. As will be discussed in detail later, the scaling factors affect the relative signal power allocated to the phase shifted input data and the pilot signals and synchronization signals with which they are combined. Transmitter 110 also is adapted to determine PARs for at least some of the candidate signals, and to identify a selected candidate signal based on the PARs (e.g., the selected candidate signal may be the candidate signal with the lowest PAR). Transmitter 110 also is adapted to transmit a wireless signal 120 representing the selected candidate signal over the wireless communication channel 106.

Receiver 114 is adapted to receive a channel-affected version 122 of the wireless signal 120 from the wireless communication channel 106. Receiver 114 also is adapted to determine estimated channel perturbations within the channel-affected signal 122 based on its knowledge of the plurality of SPS, and to apply corrections to the channel-affected signal 122, based on the estimated channel perturbations. Receiver 114 also is adapted to produce the output data symbol 132 based on the corrected signal, which represents an estimate of the input data symbol 130 processed at the transmitter 110.

As alluded to above, a wireless signal transmitted over a channel (e.g., channel 106) may be adversely affected by the channel, and a receiver that receives a channel-affected version of the transmitted signal may attempt to determine and correct for estimated channel perturbations reflected within the channel-affected signal. In fact, the channel perturbations generated by channel 106 may not be the same for signals from transmitter 110 to receiver 114 as compared to a transmission from transmitter 112 to receiver 116. A number of factors may induce differences in the forward and reverse directions. For example, when either or both devices 102, 104 are mobile, channel 106 will be time variant, and the time that transmitter 110 transmits to receiver 114 may be different from the time than transmitter 112 may transmit to receiver 116. Thus, the channel 106 will be different depending on the transmit time for each transmitter 110, 112. Furthermore, the channel 106 itself may have different characteristics in the forward direction as compared to the reverse direction. These differences may be induced by a number of factors which include, for example, device 102 possessing a transmit/receive antenna having different characteristics from the transmit/receive antenna of device 104, and/or the local scattering environment being different for each device 102, 104, among other things. In order to better convey how a receiver may determine and correct for estimated channel perturbations, in accordance with various embodiments, a simplified channel model will now be described.

Figure 2:
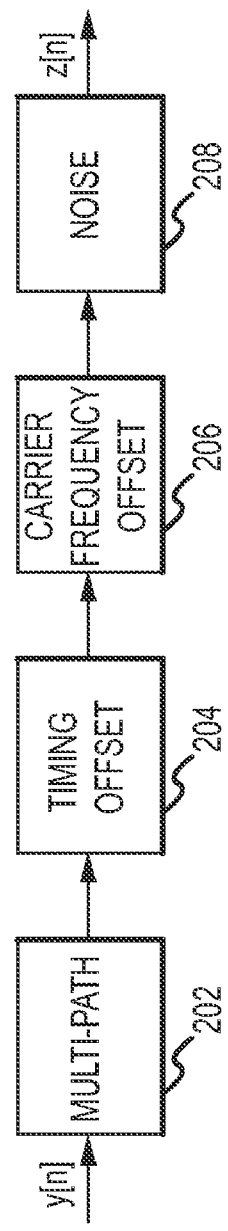
FIG. 2 is a simplified block diagram of a channel model, in accordance with an example embodiment.

FIG. 2 is a simplified block diagram of a channel model 200, in accordance with an example embodiment. In particular, channel model 200 illustrates various channel characteristics that may affect (e.g., perturb) a signal transmitted over the channel, and more particularly an unsynchronized mobile channel that operates upon signals generated by a peak power-constrained system. These characteristics include, for example, a multi-path fading component 202 (which, in the frequency domain, manifests itself as frequency selective fading), a timing offset (TO) component 204, a carrier frequency offset (CFO) component 206, and an additive noise component 208. Although not strictly part of the channel model, the input-to-output characteristic of the transmitter's power amplifier (e.g., power amplifier 316, FIG. 3), which may or may not be assumed to be time-invariant, also may affect the characteristics of a transmitted wireless signal. A signal, z[n], to which the channel model 200 and the power amplifier input-to-output characteristic has been applied may be represented, for example, by the equation:

$$z[n]=(f_{PA}(y[n-n_0])*h[\tau])e^{-j2\pi\in/N}+\eta[n],\qquad \text{(Equation 1)}$$

where $f_{PA}(\bullet)$ represents the power amplifier input-to-output characteristic, which may be assumed to be time-invariant (although the input-to-output characteristic may be time-variant, in other embodiments), $h[\tau]$ represents multi-path fading component 202, $y[n-n_0]$ represents a transmitted signal, $y[n]$, subjected to a TO component 204, $e^{-j2\pi\in/N}$ represents a CFO component 206, $\eta[n]$ represents an additive noise component 208, and * is the convolution operator.

Figure 3:
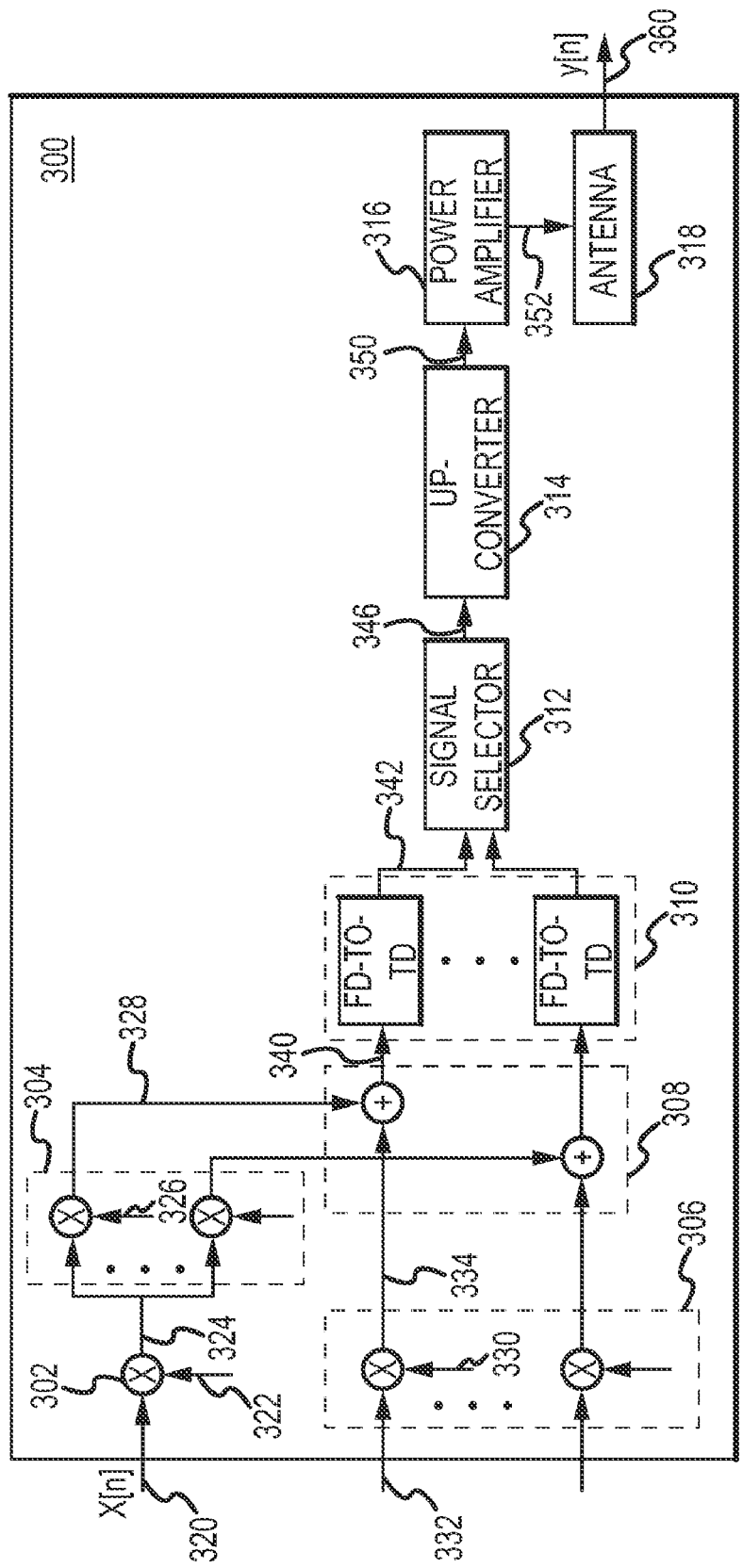
FIG. 3 is a simplified block diagram of a transmitter, in accordance with an example embodiment.

More detailed descriptions of various embodiments of transmitters (e.g., transmitter 110, FIG. 1) and receivers (e.g., receiver 114, FIG. 1) and methods of their operation will now be described. In particular, FIG. 3 is a simplified block diagram of a transmitter 300, in accordance with an example embodiment. Transmitter 300 includes a data/scaling factor combiner 302, a plurality of phase shifters 304, a plurality of SPS/scaling factor combiners 306, a plurality of data/SPS combiners 308, a plurality of frequency domain-to-time domain (FD-to-TD) transformers 310, a signal selector 312, an up-converter 314, a power amplifier 316, and an antenna 318 operatively coupled together as illustrated in FIG. 3, in an embodiment.

Data/scaling factor combiner 302 includes computational apparatus adapted to receive a sequence of input data symbols 320, $X_k$, each of which represents a data-bearing part of a signal to be transmitted. In an embodiment, $X_k$ is drawn from a finite constellation. Data/scaling factor combiner 302 is further adapted to apply a first scaling factor 322 to an input data symbol 320 in order to produce a scaled input data symbol 324. In an embodiment, the first scaling factor 322 has a value of $\sqrt{1-\rho}$, where $\rho$ is an embedding factor having a value between 0 and 1. The embedding factor represents a ratio of SPS power to signal power, which may be represented as $$\rho = \frac{\sum_k |S[k]|^2}{\sum_k |Y[k]|^2}.$$

In a particular embodiment, the embedding factor has a value in a range of about 0.25 to about 0.35. In another embodiment, the embedding factor has a value in a range of about 0.2 to about 0.4. In still other embodiments, the embedding factor may have higher or lower values than the above-given ranges. The scaled input data symbol 342 may be represented as $\sqrt{1-\rho}X_k$.

Each of the plurality of phase shifters 304 includes computational apparatus adapted to apply a different phase shift 326, $e^{j\Phi_k^{(d)}}$, to the scaled input data symbol 324, in order to produce a plurality of phase shifted input data signals 328, $\sqrt{1-\rho}X_k^{(d)}e^{j\Phi_k^{(d)}}$, where D is a value referred to herein as a candidate number quantity, d is an index referred to herein as a relational index, and $d \in \{1, 2, \ldots, D\}$. The candidate number quantity, D, may be selected as any integer number from 1 to 16, in an embodiment, although the candidate number quantity may be a larger number, in other embodiments. In a particular embodiment, the candidate number quantity is selected as an integer number between 3 and 10. In an embodiment, the number of phase shifted input data signals 328 produced equals the candidate number quantity D, although the number of phase shifted input data signals 328 may be different, in other embodiments. The different phase shifts 326 may be represented within entries of a table of phase shift values, in an embodiment, and the relational index, d, may be used as an index into the phase shift value table, among other things. Accordingly, the phase shift value table may have D entries, in an embodiment, although the phase shift value table may have more or fewer entries in other embodiments.

Transmitter 300 also is adapted to obtain a plurality of SPS 332, $S_k^{(d)}$, each of which represents a unique synchronization/pilot sequence. In an embodiment, the plurality of SPS 332 may be obtained from a table of SPS, which is accessible to or stored in transmitter 300, and which includes one or more sets of pre-generated SPS, each of which may be referenced by a unique index (referred to below as an SLM index). Each SPS 332 in the transmitter's SPS table is represented in the frequency domain, in an embodiment. In an embodiment, each SPS includes synchronization information and pilot signals, and those pilot signals may have variable pilot signal parameters (e.g., variable pilot spacing and/or pilot power). In an alternate embodiment, the synchronization information and pilots may be separately represented. Embodiments of methods for determining pilot signal parameters associated with the pilot signal portions of the SPS will be described in more detail later in conjunction with FIG. 7. Embodiments of methods for generating sets of SPS will be described in more detail later in conjunction with FIG. 8.

SPS/scaling factor combiners 306 include computational apparatus adapted to apply second scaling factors 330 to the plurality of SPS 332 in order to produce a plurality of scaled SPS 334, $\sqrt{\rho}S_k^{(d)}$, where d is the relational index. Similar to its functionality with respect to the phase shift value table, the relational index, d, also may be used as an index into the SPS table. When used in this context, the relational index alternatively may be referred to as an SLM index. As with the phase shift value table, the SPS table also may have D entries, although the SPS table may have more or fewer entries in other embodiments. In addition, in an embodiment, the number of scaled SPS 334 produced equals the candidate number quantity D, although the number of SPS 334 may be different, in other embodiments.

In the above-described embodiment, each different phase shift value 326 may be related to a unique SPS 332 via the relational index, d. In alternate embodiments, a particular phase shift value 326 may be related to multiple unique SPS 332, or a particular unique SPS 332 may be related to multiple phase shift values 326 (e.g., by including duplicate values in the phase shift value table or the SPS table, for example).

In an embodiment, the second scaling factor 330 has a value of $\sqrt{\rho}$, where $\rho$ is the same embedding factor as the embedding factor incorporated in the first scaling factor 322. As will be more clearly depicted in conjunction with FIG. 4, later, because the first and second scaling factors 322, 330 have an inverse relationship, the value of the embedding factor, $\rho$, dictates how much relative signal power is allocated to a data-bearing component, $X_k^{(d)}$, of a transmitted signal as opposed to an SPS component, $S_k^{(d)}$, of the transmitted signal.

Phase shifters 304 provide the plurality of phase shifted input data signals 328 to data/SPS combiners 308, and SPS/scaling factor combiners 306 provide the plurality of scaled SPS 334 to data/SPS combiners 308. Each of data/SPS combiners 308 includes computational apparatus adapted to combine one of the plurality of phase shifted input data signals 328 with one of the scaled SPS 334 in order to produce a plurality of combined signals 340, where the plurality of combined signals 340 may be represented in the frequency domain by the equation:

$$Y_k^{(d)} = \sqrt{\rho}S_k^{(d)} + \sqrt{1-\rho}X_k^{(d)}e^{j\phi_k^{(d)}}.$$ (Equation 2)

In an embodiment, the number of combined signals 340 produced equals the candidate number quantity D, although the number of combined signals 340 may be different, in other embodiments.

Data/SPS combiners 308 provide the plurality of combined signals 340 to FD-to-TD transformers 310. FD-to-TD transformers 310 include computational apparatus adapted to perform frequency domain-to-time domain transformations on each of the combined signals 340, in order to produce a plurality of candidate signals 342, $y^{(d)}[n]$. In an embodiment, the number of candidate signals 342 produced equals the candidate number quantity D, although the number of candidate signals 342 may be different, in other embodiments. The frequency domain-to-time domain transformation may include an inverse Fourier transform (IFT) or, more particularly, an inverse discrete Fourier transform (IDFT), in various embodiments, although other types of frequency domain-to-time domain transformations may be performed in other embodiments. Accordingly, in an embodiment, the plurality of candidate signals 342 may be represented as $y^{(d)}[n] = \text{IDFT}\{Y_k^{(d)}\}$ or alternatively by the following:

$$y^{(d)}[n] = \frac{1}{\sqrt{N}}\sum_{k=0}^{N-1} Y_k^{(d)}e^{j2\pi kn/N}$$ (Equation 3)
$$= x^{(d)}[n]\sqrt{(1-\rho)} + s^{(d)}[n]\sqrt{(\rho)}$$

where $x^{(d)}[n]=\text{IDFT}\{X_k e^{j\Phi_k^{(d)}}\}$, $s^{(d)}[n]=\text{IDFT}\{S_k^{(d)}\}$, and $n \in \{0, 1, \ldots, N-1\}$. In an embodiment, an efficient algorithm for computing the inverse discrete Fourier transform (IDFT) may be implemented, such as an inverse fast Fourier transform (IFFT), for example.

The above description indicates that, in an embodiment, transmitter 300 includes a number of phase shifters 304, a number of SPS/scaling factor combiners 330, a number of data/SPS combiners 308, and a number of FD-to-TD transformers 310 that is equal to the candidate number quantity, D, and that these transmitter elements are adapted to generate a same number, D, of phase shifted input data signals 328, scaled SPS 334, combined signals 340, and candidate signals 342, respectively. In other embodiments, transmitter 300 may include more or fewer than the candidate number quantity, D, of phase shifters 304, SPS/scaling factor combiners 330, data/SPS combiners 308, and/or FD-to-TD transformers 310, and/or some or all of these transmitter elements may be adapted to generate more or fewer than the candidate number quantity, D, of phase shifted input data signals 328, scaled SPS 334, combined signals 340, and/or candidate signals 342, respectively. Although the number of phase shifters 304, SPS/scaling factor combiners 330, data/SPS combiners 308, and/or FD-to-TD transformers 310 may be the same, in an embodiment, in other embodiments, the numbers of these transmitter components 304, 330, 308, 310 and/or signals 328, 334, 340, 342 may be different. For example, but not by way of limitation, data/SPS combiners 308 may combine a same phase shifted input data signal 328 with multiple scaled SPS 334 or data/SPS combiners 308 may combine a same scaled SPS 334 with multiple phase shifted input data signals 328, in various embodiments. In other embodiments, some signals may be disregarded when, for example, they fail to meet certain criteria and/or threshold levels, which ultimately may result in fewer than the candidate number quantity, D, of candidate signals 342 being provided to signal selector 312. Accordingly, embodiments of the inventive subject matter are not limited to there being a same number, D, of transmitter components 304, 330, 308, 310 and/or signals 328, 334, 340, 342.

FD-to-TD transformers 310 provide the plurality of candidate signals 342 to signal selector 312. In an embodiment, signal selector 312 includes computational apparatus adapted to determine peak-to-average ratios (PARs) for some or all of the candidate signals 342, and based on the PARs, to identify a selected signal 346 from the candidate signals 342.

As used herein, the term peak-to-average ratio (PAR) means a measurement of a waveform that equals the peak amplitude of the waveform divided by the root mean squared (RMS) or time averaged value of the waveform. Although PAR reduction is discussed extensively herein, embodiments also apply to peak-to-average power ratio (PAPR) reduction, and use of the term PAR herein is intended to include at least PAR and PAPR. PAR is a metric that facilitates an assessment of the dynamic range of a signal, and a signal with a low PAR may be preferable, because it may allow the power amplifier 316 to operate at higher power efficiencies without substantial signal distortion. In an embodiment, the PAR for each of the candidate signals 342 may be calculated according to the following equation:

$$PAR\{y^{(d)}[n]\} = \frac{\max_n |y^{(d)}[n]|^2}{E[|y^{(d)}[n]|^2]}.$$ (Equation 4)

In an embodiment, signal selector 312 performs a next step of a selected mapping (SLM) process, which is a PAR reduction tool that may reduce the PAR of OFDM symbols by multiple decibels (dBs). In a particular embodiment, signal selector 312 is adapted to identify the selected signal 346 as the candidate signal 342 with the lowest PAR. A selected mapping (SLM) index, $\tilde{d}$, of the candidate signal 342 with the lowest PAR may be determined, in an embodiment, according to the following equation:

$$\tilde{d} = \min_d PAR\{y^d[n]\}.$$ (Equation 5)

In accordance with an embodiment, PAR reduction is achieved by using D candidate signals 342, and selecting the candidate signal 342 with the lowest PAR. In another embodiment, additional PAR reduction is achieved based on the design of the SPS 330, as will be described in more detail later. More particularly, when $IDFT\{S_k^{(d)}\}=s^{(d)}[n]$ has low PAR, the combined sequence of $y^{(d)}[n]=x^{(d)}[n]\sqrt{(1-\rho)}+s^{(d)}[n]\sqrt{(\rho)}$ may, on average, have a lower PAR than $x^{(d)}[n]$. The extent of PAR reduction is related to the magnitude of the embedding factor, $\rho$. When the embedding factor is increased, PAR reductions also are increased. In an embodiment, the SPS 330 are designed to have a relatively low PAR (e.g., PAR<0.5 dB). In a particular embodiment, the SPS 330 are designed with arbitrary power spectral densities (PSD) using a convex optimization algorithm, as will be described in more detail later.

In order for the receiver (e.g., receiver 114, FIG. 1) to recover the input data symbol 320, $X_k$ (e.g., to determine an estimate, $\hat{X}_k$, of the input data symbol), the receiver should have knowledge of or estimate the SLM index, $\tilde{d}$. In an embodiment, the receiver has knowledge of possible values for $S_k^{(d)}$ and $\phi_k^{(d)}$ in the form of one or more tables that are accessible to (e.g., stored at) the receiver (e.g., receiver 114), where those tables correspond to the phase shift value table and the SPS table accessible to the transmitter 300. Accordingly, when the receiver has knowledge of SLM index, $\tilde{d}$, it may recover the input data symbol 320, $X_k$. Embodiments of methods and apparatus for a receiver to obtain knowledge of the SLM index, $\tilde{d}$ (e.g., to recover the SLM index, $\tilde{d}$, or to determine an estimate $\tilde{d}$ of the SLM index) will be discussed in more detail below, in conjunction with FIG. 6. Basically, embodiments achieve blind phase sequence detection without time and/or frequency synchronization, and/or a priori knowledge of the channel.

Up-converter 314 receives the selected signal 346, and is adapted to perform a frequency up-conversion and digital-to-analog conversion process on the selected signal 346 in order to convert the selected signal from a baseband or intermediate frequencies (IF) to the radio frequency (RF) band. The analog up-converted signal 350 is then amplified by power amplifier 316 to produce an amplified signal 352. Power amplifier 316 may add non-linear distortion to the amplified signal 352. Accordingly, in an embodiment, transmitter 300 may include a feedback loop adapted to analyze the amplified signal 352 and to apply digital pre-distortion to the input data, although this is outside the scope of the present application and is not depicted in FIG. 3. The amplified signal 352 is converted to an analog RF signal 360 and transmitted over the channel (e.g., channel 106, FIG. 1) by antenna 318. Unlike some traditional techniques, the analog RF signal 360 may be transmitted without a preamble, and the embedded synchronization/pilot sequence information provides a way for a receiver robustly to synchronize with a channel-affected version of the transmitted signal, as will be described in detail in conjunction with FIG. 6.

Figure 4:
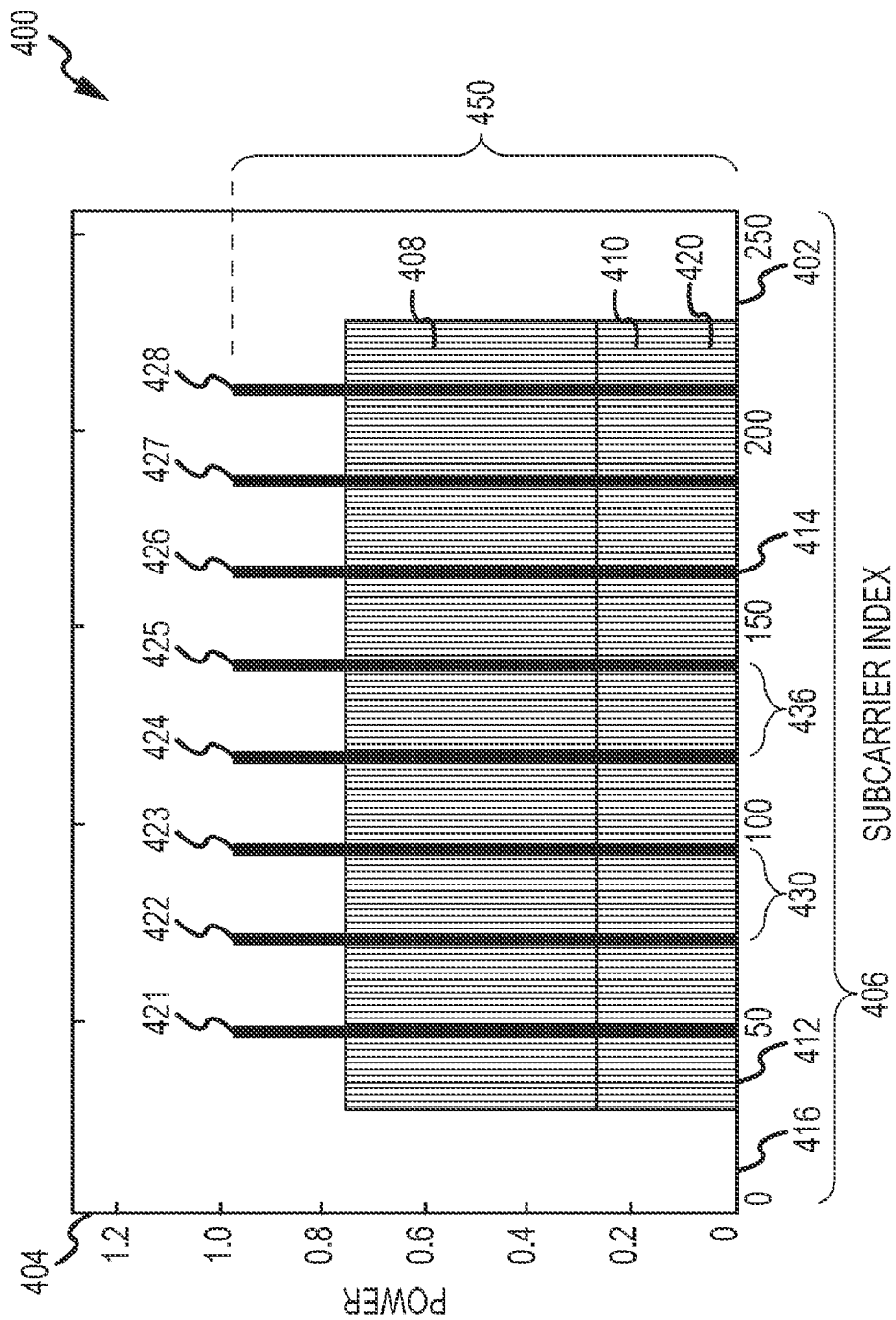
FIG. 4 is an example of a frequency-domain representation of a transmit signal with evenly-spaced, equal-power pilots.

FIG. 4 is an example of a frequency-domain representation of a transmit signal 400, $Y_k$, with evenly-spaced, equal-power pilot signals. Axis 402 represents frequency, and axis 404 represents signal power (e.g., in dB). Signal 400 may represent a signal that is generated by a PSAM OFDM system with null edge sub-carriers. Within frequency band 406, the transmit signal 400 includes a data component 408, $X_k$, and an SPS component 410, $S_k$, which are modulated onto a plurality, N, of sub-carriers. The subcarriers occupied by the various components of the transmit signal 400, may be decomposed into several non-overlapping parts or disjoint sets, which span all N baseband subcarrier indices: 1) data-bearing subcarriers 412, which may be denoted by a set of indices $K_d$; pilot subcarriers 414, which may be denoted by a set of indices $K_p$; and null edge subcarriers 416, which may be denoted by the set of indices $K_n$.

In an embodiment, $X_{k \notin K_d}=0$, so that the data component 408 of the transmit signal 400 only contains energy in data-bearing subcarriers 412. Null edge subcarriers 416 may be constrained to zero, in an embodiment. Pilot signals 421, 422, 423, 424, 425, 426, 427, 428 may be defined as part of an SPS. The signal segmentations may be summarized as Table 1, below:

TABLE 1

|  | $k \in K_d$ | $k \in K_p$ | $k \in K_n$ |
|---|---|---|---|
| $X_k$ | $\neq 0$ | $=0$ | $=0$ |
| $S_k$ | $\neq 0$ | $\neq 0$ | $=0$ |
| $Y_k$ | $\neq 0$ | $\neq 0$ | $=0$ |

SPS component 410 includes synchronization sequence information 420 conveyed within synchronization subcarriers 412 (e.g., data-bearing subcarriers 412), and a plurality of pilot signals 421-428 conveyed within pilot subcarriers 414, in an embodiment. Because at least some of the synchronization subcarriers 412 occupied by the SPS component 410 are the same as the data-bearing subcarriers 412 occupied by the data component 408, the synchronization sequence information 420 (and thus the SPS component 410) may be considered to be "embedded" within the data component 408.

As illustrated in FIG. 4, pilot signals 421-428 are evenly-spaced, and have equal power. As defined earlier, this means that, within frequency band 406, the number of non-pilot subcarriers (e.g., data-bearing subcarriers 412) between each pair of adjacent pilot signals 421-428 is the same for each pair of adjacent pilot signals in the plurality of pilot signals 421-428. For example, the number of non-pilot subcarriers 430 between adjacent pilot signals 422, 423 is the same as the number of non-pilot subcarriers 436 between adjacent pilot signals 424, 425. The same holds true for each other pair of adjacent pilot signals in the plurality of pilot signals 421-428.

In addition, the power 450 contained within each pilot signal 421-428 is substantially equal for each of the plurality of pilot signals 421-428. The amount of power 450 in pilot signals 421-428 may be quantified according to the equation:

$$\beta = \frac{\sum_{k \in K_p} |S[k]|^2}{\sum_{k \in K_p \cup K_d} |S[k]|^2},$$ (Equation 6)

which is the ratio of pilot power to the total SPS power.

Pilot signals 421, 428 are located toward either end of the data bearing subcarriers 412, and accordingly are located near the guard bands defined by the null edge subcarriers 416. Because of the discontinuity introduced by the guard band, pilot signals 421, 428 are not evenly-spaced with respect to any pilot signal (not illustrated) within a neighboring channel (also not illustrated). As discussed previously, these discontinuities interfere with the ability to provide evenly-spaced pilots across adjacent channels, which may result in decreased channel estimation and/or SER performance when compared with traditional systems in which guard bands are not implemented, and thus evenly-spaced pilots may be implemented across adjacent channels. However, as also discussed previously, guard bands may be desirable in order to limit the amount of spectral regrowth that may encroach on neighboring channels. In contrast to the signal 400 illustrated in FIG. 4, signals generated and communicated according to various embodiments include a plurality of pilot signals that have unequal power and/or are unevenly-spaced.

Figure 5:
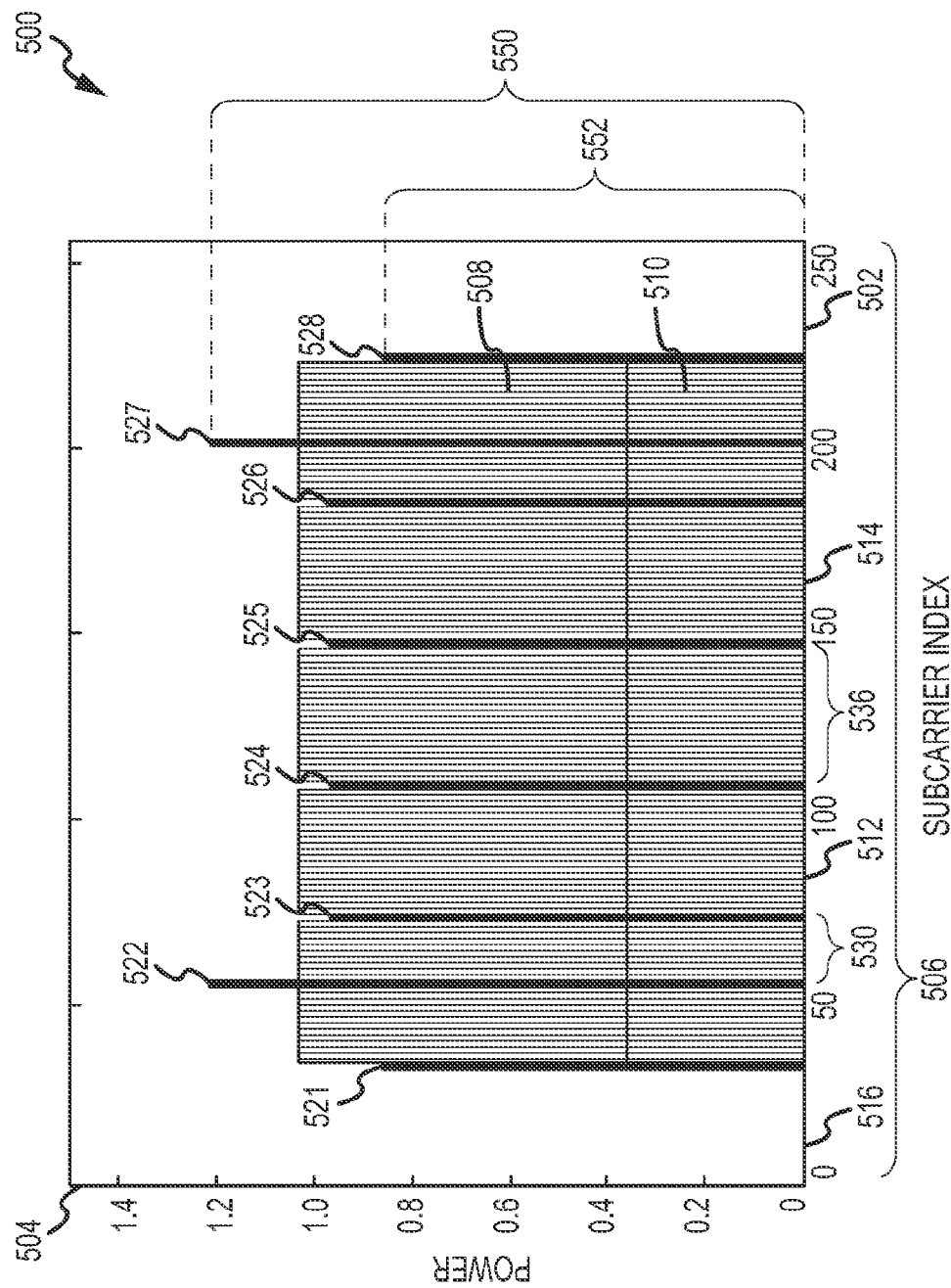
FIG. 5 is an example of a frequency-domain representation of a transmit signal with unevenly-spaced, unequal power pilots, in accordance with an example embodiment.

FIG. 5 is an example of a frequency-domain representation of a transmit signal 500 with unevenly-spaced, unequal power pilot signals, in accordance with an example embodiment. FIG. 5 is similar to that of FIG. 4 in that axis 502 represents frequency, and axis 504 represents signal power (e.g., in dB). Signal 500 may represent a signal that is generated by a PSAM OFDM system with null edge sub-carriers. Within frequency band 506, the transmit signal 500 includes a data component 508, $X_k$, and an SPS component 510, $S_k$, which are modulated onto a plurality, N, of sub-carriers. More particularly, the subcarriers occupied by the various components of the transmit signal 500 may be decomposed into several non-overlapping parts: 1) data-bearing subcarriers 512, which may be denoted by a set of indices $K_d$; pilot subcarriers 514, which may be denoted by a set of indices $K_p$; and null edge subcarriers 516, which may be denoted by the set of indices $K_n$. In an embodiment, $X_{k \notin K_d}=0$, so that the data component 508 of the transmit signal 500 only contains energy in data-bearing subcarriers 512. Null edge subcarriers 516 may be constrained to zero, in an embodiment, to limit the amount of spectral regrowth that may encroach on neighboring channels. Pilot signals 521, 522, 523, 524, 525, 526, 527, 528 may be defined as part of the SPS (e.g., SPS 332, FIG. 3 and SPS 638, FIG. 6), in an embodiment. In an alternate embodiment, pilot signals 521-528 may be separate from the SPS.

In contrast with the transmit signal 400 illustrated in FIG. 4, the transmit signal 500 of FIG. 5 includes pilot signals 521-528 that are unevenly-spaced and have unequal power. As defined earlier, this means that, within frequency band 506, the number of non-pilot subcarriers (e.g., data-bearing subcarriers 512) between at least one pair of adjacent pilot signals 521-528 is not the same as the number of non-pilot subcarriers between at least one other pair of adjacent pilot signals in the plurality of pilot signals 521-528, although the number of non-pilot subcarriers may be the same for two or more different pairs of adjacent pilot signals 521-528. For example, the number of non-pilot subcarriers 530 between adjacent pilot signals 522, 523 is not the same as the number of non-pilot subcarriers 536 between adjacent pilot signals 524, 525. In an embodiment, the pilot subcarrier 514 spacing may be less than the number of null edge subcarriers (e.g., $N/|K_p|>|K_n|$) for each pair of adjacent pilot signals 521-528.

In addition, in an embodiment, the pilot signals 521-528 may have unequal power. As also defined earlier, this means that, within frequency band 506, the power contained within one or more of the pilot signals 521-528 in the plurality of pilot signals 521-528 is substantially different from the power contained within one or more other pilot signals 521-528 in the plurality of power signals 521-528, although two or more pilot signals 521-528 may contain substantially equal power. For example, the power 550 contained within pilot signal 527 is substantially greater than (e.g., about 0.35 dB) the power 552 contained within pilot signal 528.

In an embodiment, such as that illustrated in FIG. 5, frequency band 506 includes two hundred and fifty-six total sub-carriers (e.g., N=256), two hundred and one hundred and ninety-two data-bearing subcarriers 512, eight pilot subcarriers 514, and fifty-six null edge sub-carriers 516 (e.g., 28 null edge sub-carriers in the lower-frequency guard band and 28 null edge sub-carriers in the upper-frequency guard band). However, these numbers of subcarriers are used for example purposes only, and more or fewer total sub-carriers, data-bearing subcarriers 512, pilot subcarriers 514, and/or null edge sub-carriers 516 may be utilized, in other embodiments.

In the embodiment illustrated in FIG. 5, pilot signals 521-528 have variable pilot signal parameters. More specifically, the pilot signal parameter of pilot signal spacing is different for at least two different pairs of adjacent pilot signals, and the pilot signal parameter of pilot power is different for at least two pilot signals. In other embodiments (not illustrated), pilot signals may have uneven spacing or unequal power, but not both. Embodiments of methods for determining variable pilot signal parameters will be discussed later, in conjunction with FIG. 7.

Referring again to FIG. 3 and also to FIG. 5, in the frequency domain, transmit signal 500, $Y_k$, may be represented according to the equation:

$$Y_k = X_k\sqrt{1-\rho} + S_k\sqrt{\rho},$$ (Equation 7)

where $X_k$ represents and input data symbol 320, $S_k$ represents an SPS 332, $\sqrt{1-\rho}$ represents a first scaling factor 322, and $\sqrt{\rho}$ represents a second scaling factor 330. As mentioned previously, because the first and second scaling factors 322, 330 have an inverse relationship, the value of the embedding factor, $\rho$, dictates how much relative signal power is allocated to the data component 508, $X_k$, of the transmit signal 500 as opposed to the SPS component 510, $S_k$, of the transmit signal 500.

In an embodiment, the embedding factor, $\rho$, has a fixed value, and accordingly the first scaling factor 322 and the second scaling factor 330 also have fixed values. In another embodiment, the transmitter 300 may adjust the value of the embedding factor dynamically. When the embedding factor is increased, the relative power of the SPS component 510 with respect to the data component 508 also will increase. This may be desirable, for example, when the channel is relatively harsh, and increased PAR reductions are desired. However, a tradeoff to increasing the embedding factor (and thus increasing PAR reductions) may be that, as a harsh channel improves (e.g., becomes less harsh), the receiver may have more than enough channel SNR to demodulate, although the received signal SNR may be limited by the distortion induced by the power amplifier 316. In an embodiment, the receiver may feed back information back to the transmitter 300, which indicates the receiver demodulation performance, and thus that the transmitter 300 may increase D and/or $\rho$. Such increases may enable transmitter 300 further to reduce PAR and to minimize the probability of distortion to the transmitted signal that may be induced by the non-linear power amplifier 316. Alternatively, when the embedding factor is decreased, the relative power of the SPS component 510 with respect to the data-bearing component 408 also will decrease. Decreasing the embedding factor may be desirable, for example, when the power amplifier 316 is not inducing significant distortion onto the transmitted signal, and when the demodulation performance of the receiver (e.g., as indicated through feedback from the receiver) is not significantly limited by power amplifier induced distortions and/or by channel multi-path induced distortion, provided that sufficient synchronization performance may still be achieved. However, decreasing the embedding factor may result in smaller PAR reductions. In still another embodiment, the value of the embedding factor may be set to 0, and/or data/scaling factor combiner 302 and SPS/scaling factor combiners 306 may be disabled. In that case, transmit signal 500 will include only a data component 508, as the power of any SPS component 510 effectively will have been reduced to zero. In such an embodiment, a preamble (not illustrated) may be transmitted along with the data in order to facilitate synchronization with the signal at the receiver.

Figure 6:
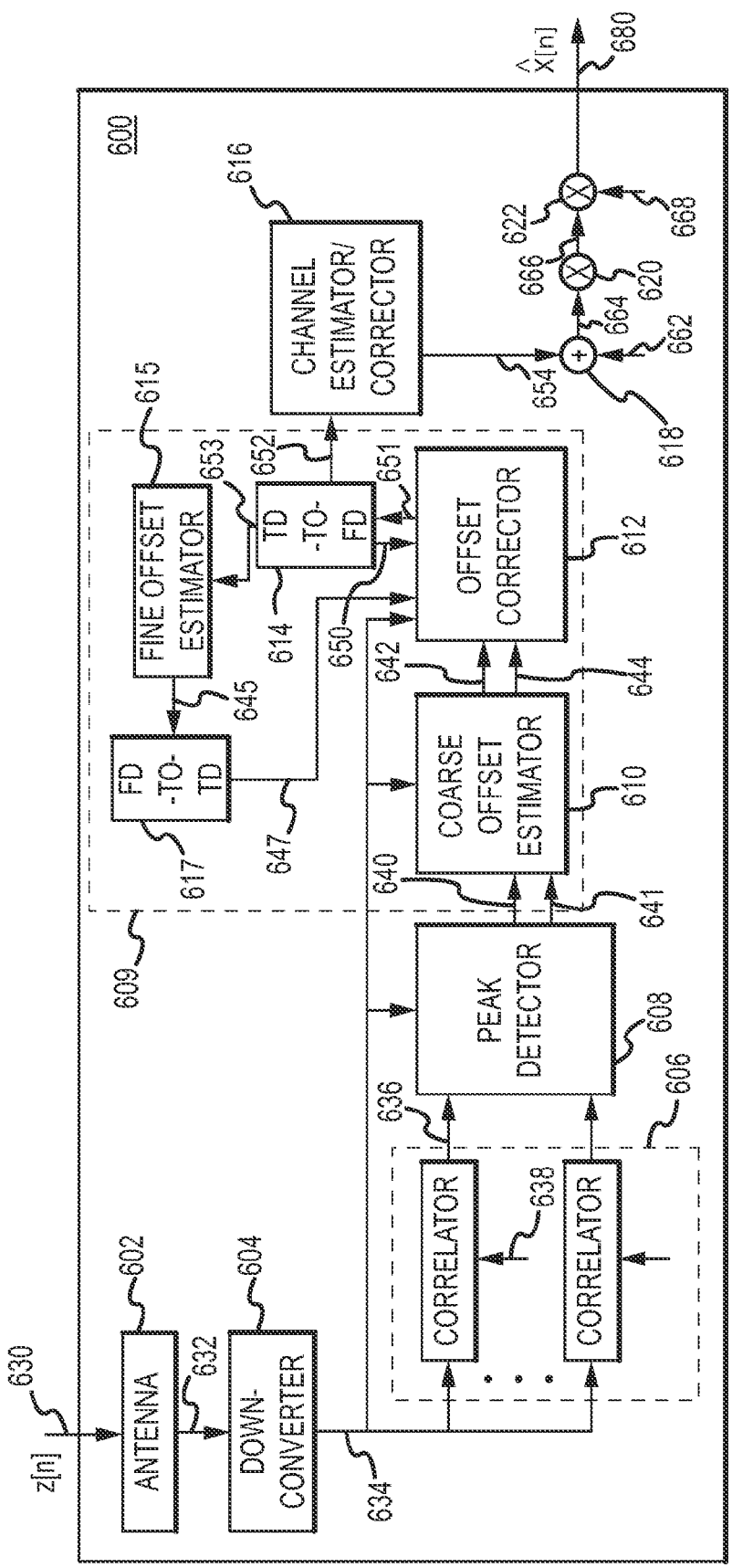
FIG. 6 is a simplified block diagram of a receiver, in accordance with an example embodiment.

FIG. 6 is a simplified block diagram of a receiver 600, in accordance with an example embodiment. Receiver 600 includes an antenna 602, a down-converter 604, a plurality of correlators 606, a peak detector 608, offset estimator/corrector 609, a channel estimator/corrector 616, an SPS removal element 618, scaling element 620, and a phase shift element 622 operatively coupled together as illustrated in FIG. 6, in an embodiment. As will be described in detail below, receiver 600 includes a conjugate correlation receiver, which is adapted to perform a blind phase sequence detection method, in which the receiver 600 may exclude the traditional processes of performing time or frequency synchronization, and in which the receiver 600 may not have a priori knowledge of the channel characteristics.

Antenna 602 is adapted to receive a wireless RF signal 630 from the channel, and to produce an analog RF signal 632. As discussed in detail above, the wireless RF signal 630 represents a channel-affected version of a selected signal that includes a data signal combined with an SPS. Down-converter 632 is adapted to perform an analog-to-digital conversion and a frequency down-conversion process on the analog RF signal 632, in order to produce an IF or baseband received signal 634. Essentially, the received signal 634 represents a channel-affected version of a selected signal (e.g., selected signal 346, FIG. 3) that was transmitted by a transmitter (e.g., transmitter 300, FIG. 3) over a channel. The received signal 634 may be represented by the following equation:

$$z^{(\tilde{d})}[n] = (f_{PA}(y^{(\tilde{d})}[n-n_0])*h[\tau])e^{j2\pi\epsilon/N} + \eta[n], \quad \text{(Equation 8)}$$

where $f_{PA}(\bullet)$ represents the power amplifier input-to-output characteristic, which may be assumed to be time-invariant (although the input-to-output characteristic may be time-variant, in other embodiments), $h[\tau]$ represents a multi-path fading component of the channel, $y^{(\tilde{d})}[n-n_0]$ represents the transmitted signal, $y^{(\tilde{d})}[n]$, subjected to a TO component, $e^{-j2\pi\epsilon/N}$ represents a CFO component, $\eta[n]$ represents an additive noise component, * is the convolution operator, and $\tilde{d}$ is the SLM index. It is to be noted that any carrier phase shift present between the transmitter and receiver is assumed to be included in the phase of the channel at the receiver.

As will be described in detail below, transmitter 600 is adapted to determine estimated channel perturbations (e.g., multi-path fading, TO, CFO, and/or other signal perturbations) reflected within the received signal 634, to apply corrections to the received signal 634 based on the estimated channel perturbations, and to produce an output data symbol 580 based on the corrected received signal, where the output data symbol 580 represents an estimate of the input data symbol (e.g., input data symbol 320, FIG. 3) that was processed and transmitted by the transmitter.

In an embodiment, estimated channel perturbations are determined by the plurality of correlators 606, the peak detector 608, the offset estimator/corrector 609, and the channel estimator/corrector 616. The plurality of correlators 606 includes computational apparatus adapted to receive the received signal 634, to obtain a plurality of candidate synchronization sequences 638, and to produce a plurality of conjugate correlation (CC) outputs 636, $r^{(\tilde{d})}[u]$. More particularly, each correlator 606 is adapted to correlate the received signal 634 with a different candidate synchronization sequence 638, $s^{(\tilde{d})}[n]$.

In an embodiment, the candidate synchronization sequences 638 include time-domain versions of the same synchronization/pilot sequences (e.g., SPS 332, FIG. 3) as were combined by the transmitter (e.g., transmitter 300, FIG. 3) with the phase shifted input data (e.g., phase shifted input data 328, FIG. 3). As mentioned previously, both the transmitter (e.g., transmitter 300) and the receiver 600 each may have knowledge of the candidate SPS by each having access to substantively identical tables of SPS, although the transmitter's SPS table may include SPS represented in the frequency domain, and the receiver's SPS table may include the same SPS represented in the time domain, in an embodiment.

The plurality of conjugate correlation outputs 636 may be represented by the equation:

$$r^{(\tilde{d})}[u] = CC\{s^{(\tilde{d})}[n], z^{(\tilde{d})}[n-u]\}, \quad \text{(Equation 9)}$$

where the conjugate correlation between two length-N sequences may be defined as:

$$CC\{a[n],b[n]\} = \left(\sum_{n=0}^{(N/2)-1} a^*[n]b[n-u]\right) \cdot \left(\sum_{n=N/2}^{N-1} a^*[n]b[n-u]\right)^*. \quad \text{(Equation 10)}$$

where (•)* is the conjugate operation.

In an embodiment, the number of conjugate correlation outputs 636 produced equals the candidate number quantity D, although the number of conjugate correlation outputs 636 may be different, in other embodiments.

In an embodiment, the received signal 634 may be divided into a plurality of subcode sequences in order to reduce the number of operations associated with performing the correlation process. In such an embodiment, each conjugate correlation output 636 may be produced, by generating a sub-correlation for each subcode sequence, and summing together the sub-correlations to form a summed result having a single correlation peak.

Correlators 606 provide the plurality of conjugate correlation outputs 636 to peak detector 608. In an embodiment, correlators 606 may not provide (or peak detector 608 may not evaluate) those of the plurality of conjugate correlation outputs 636 that have correlation peaks below a threshold. Peak detector 608 includes computational apparatus adapted to determine an estimate of the SLM index 640, $\hat{d}$, based on the conjugate correlation outputs 636. In an embodiment, the SLM index estimate 640 is determined according to the equation:

$$\hat{\hat{d}} = \arg\max_d |r^{(d)}[u]|. \quad \text{(Equation 11)}$$

Accordingly, the SLM index estimate 640 corresponds to the conjugate correlation output 636 that represents a highest correlation peak. Unlike traditional methods, embodiments include blind phase sequence detection criterion (e.g., no side information representing the SLM index is transmitted) in order to determine the SLM index estimate 640, and the SLM index estimate 640 is determined based on the conjugate correlations between the received signal 634 and the candidate synchronization sequences 638. Correct detection of d may depend on the magnitude of the peaks of $|r^{(d)}[u]|$ for d≠$\hat{d}$, also referred to herein as "spurious correlation peaks." When the spurious correlation peaks all are less than the peak in $|r^{(\hat{d})}[u]|$, $\hat{d}$ may be correctly detected (e.g., $\hat{\hat{d}}=\hat{d}$). In an embodiment, and as will be described in more detail later, the candidate SPS 638 are designed so that the spurious correlation peaks are low. In a particular embodiment, the candidate SPS 638 are designed so that:

$$[\max CC\{s^{(d)}[n],s^{(d)}[n-u]\}]<\text{th}_{self}, \quad \text{(Equation 12)}$$

where $\text{th}_{self}$ is a threshold that provides adequate system performance. Peak detector 608 provides the SLM index estimate 640, $\hat{\hat{d}}$, to offset estimator/corrector 609 (or more particularly to coarse offset estimator 610), along with the $\hat{d}$th conjugate correlation output 641 (although this may be obtained from elsewhere, as well).

Offset estimator/corrector 609 includes a coarse offset estimator 610, an offset corrector 612, a time domain-to-frequency domain (TD-to-FD) transformer 614, a fine offset estimator 615, and a frequency domain-to-time domain (FD-to-TD) transformer 617, in an embodiment. Coarse offset estimator 610 includes computational apparatus adapted to determine a plurality of channel perturbations, including coarse timing offset (TO) estimates 642 and coarse carrier frequency offset (CFO) estimates 644.

In an embodiment, coarse offset estimator 610 is adapted to determine a coarse timing offset estimate 642, $\hat{n}_0$, according to the equation:

$$\hat{n}_0 = \arg\max_u |r^{(\hat{d})}[u]|. \quad \text{(Equation 13)}$$

Accordingly, the coarse timing offset estimate 642 is determined based on the maximum of the $\hat{d}$th conjugate correlation output. Assuming that $\hat{\hat{d}}=\hat{d}$, the coarse timing offset estimate should be determined (or "detected") correctly as long as $|r^{(\hat{d})}[n_0]|>r^{(\hat{d})}[n]$ for n≠$n_0$.

In an embodiment, coarse offset estimator 610 also is adapted to determine a coarse estimate of the carrier frequency offset (CFO) 644, $\hat{\epsilon}$, according to the equation:

$$\hat{\epsilon}=\text{angle}(r^{([\$]\$^{-\$\$[[\$]\$^{-}A\tilde{x}d})}[\hat{n}_0]) \quad \text{(Equation 14)}$$

Essentially, the coarse CFO estimate is determined as the phase of the conjugate correlation output 636 that was determined by peak detector 608 to have the highest correlation peak.

In an embodiment, the coarse offset and estimator 610 provides the estimated channel perturbations (e.g., coarse timing offset estimates 642 and coarse CFO estimates 644) to offset corrector 612. Offset corrector 612 includes computational apparatus adapted to receive the received signal 634 and the estimated channel perturbations, and to effectively compensate for those estimated channel perturbations in the received signal 634 by aligning the received signal 634 on a symbol boundary using the coarse timing offset estimate 642 and the coarse CFO estimate 644, which may include removing the cyclic extension from the received signal 634. In an embodiment, offset corrector 612 produces a coarsely-corrected signal 650.

Once the coarse timing and carrier frequency offsets are removed, the coarsely-corrected signal 650 may be transformed to the frequency domain by time domain-to-frequency domain (TD-to-FD) transformer 614, which includes computational apparatus adapted to perform a time domain-to-frequency domain transformation on the corrected signal 650, in order to produce a frequency-domain, coarsely-corrected signal 653. The time domain-to-frequency domain transformation may include a Fourier transform (FT) or, more particularly, a fast Fourier transform (FFT), in various embodiments, although other types of time domain-to-frequency domain transformations may be performed in other embodiments.

In an embodiment, fine offset estimation may then be performed using fine offset estimator 615. In an embodiment, fine offset estimator 615 determines a fine CFO estimate, which is applied to the coarsely-corrected signal 650 by offset corrector 612. In an embodiment, fine offset estimator 615 determines a fine CFO estimate, $\hat{\epsilon}$, using the pilot signals (e.g., pilot signals 420, FIG. 4) within the frequency-domain, coarsely-corrected signal 653. In an embodiment, this includes estimating the phase of each pilot signal (e.g., pilot signals 420), and determining the phase change in any particular pilot signal from OFDM symbol to OFDM symbol. Thus, the fine CFO estimate may be determined using the common sub-carrier phase difference between OFDM symbols, which may then be averaged across all pilot sub-carriers to minimize estimation variance.

The frequency domain pilot part of the received signal for two consecutive sets of pilot symbols may be approximated as $Y_{k1}^P = X_{k1}^P H_{k1}^P e^{-j2\pi \in_1/N}$ and $Y_{k2}^P = X_{k2}^P H_{k2}^P e^{-j2\pi \in_2/N}$, respectively. The phases $\phi_{ki1}$ and $\phi_{ki2}$ may be computed as $\angle Y_{k1}^P$ and $\angle Y_{k2}^P$ (where $\angle$ represents the angle), respectively. Then, the fine CFO estimate, may be determined according to the equation:

$$CFO = \frac{1}{2\pi T_s} \sum_{k=0}^{|K_{pi}-1|} (\phi_{k1} - \phi_{k2}).$$  (Equation 15)

Fine offset estimator 615 may provide the fine CFO estimate to offset corrector 612 via a feedback path (not illustrated). In addition, fine offset estimator 615 provides a feedback version 645 of the frequency-domain, coarsely-corrected signal to offset corrector 612 via frequency domain-to-time domain (FD-to-TD) transformer 617, which transforms the feedback version 645 of the coarsely-corrected signal into the time domain to produce a time-domain, fed back, coarsely-corrected signal 647. In an alternate embodiment, the coarsely-corrected signal 650 is retained in memory, and is not fed back to offset corrector 612. Either way, offset corrector 612 applies the fine CFO estimate to the coarsely-corrected signal (either signal 650 or 647) to reproduce the finely-corrected signal 651. In an alternate embodiment, fine CFO correction may be performed in the frequency domain after fine offset estimator 615, rather than performing the fine CFO correction in the time domain by offset corrector 612.

In a further embodiment, fine offset estimator 615 also may determine a fine timing offset estimate and/or a carrier phase offset estimate. For example, fine offset estimator 615 may determine a fine timing offset estimate based on the phase slope between pilot sub-carriers common to each OFDM symbol, which also can be averaged over all symbols. Fine offset estimator 615 may determine a carrier phase offset estimate from the mean value of the phase slope in each OFDM symbol, in an embodiment.

When a fine timing and/or carrier phase offset are estimated, fine offset estimator 615 provides the fine timing and/or carrier phase offsets to channel estimator/corrector 616, in an embodiment, for correction of the fine timing and/or carrier phase offset in the frequency domain. In an alternate embodiment, fine offset estimator 615 may provide the fine timing and/or carrier phase offsets, if estimated, to offset corrector 612 for correction in the time domain.

Either way, the finely-corrected signal 651 is transformed to the frequency domain by TD-to-FD transformer 614, and the resulting corrected signal 652 is provided to channel estimator/corrector 616. Channel estimator/corrector 616 receives the corrected signal 652, determines a channel estimate, and based on the channel estimate, proceeds to equalize the channel effects in the corrected signal 652 to produce an equalized combined signal 654. Channel estimator/corrector 616 is adapted to determine a channel estimate, $\hat{H}_k$ based on the corrected signal 652. In an embodiment, the channel estimate is determined by generating a first quantity according to the equation:

$$W_k^{(\tilde{d})} = IDFT\{z^{(\tilde{d})}[n+\hat{n}_0]\}e^{j2\pi \tilde{\in}/N},$$  (Equation 16)

which yields $W_k^{(\tilde{d})} = Y_k^{(\tilde{d})} H_k + \eta_k + \delta_k + \iota_k$, where $\delta_k$ is the distortion noise caused by the power amplifier (e.g., power amplifier 316, FIG. 3), $\iota_k$ is the inter-carrier interference, and $H_k$ and $\eta_k$ are the IDFTs of h[n] and η[n], respectively. From $W_k^{(\tilde{d})}$, channel estimator/corrector 616 may estimate the channel in the pilot subcarriers (e.g., pilot subcarriers 414, FIG. 4) according to the equation:

$$\hat{H}_k = \frac{W_k^{(\tilde{d})}}{s_k^{(\tilde{d})}\sqrt{\rho}}, k \in K_p.$$  (Equation 17)

In an embodiment, channel estimator/corrector 616 may interpolate the pilot subcarrier channel estimates to the data-bearing subcarriers (e.g., data-bearing subcarriers 412, FIG. 4), $k \in K_d$ so that $\hat{H}_k$ is defined for $k \in K_d \cup K_p$.

In an alternate embodiment, assumptions may be made that all of the synchronization works perfectly (e.g., $\hat{\tilde{d}} = \tilde{d}$, $\hat{n}_0 = n_0$, and $\hat{\in} = \in$) and that no distortion noise is introduced by the transmitter power amplifier (e.g., power amplifier 316, FIG. 3). With those assumptions, the first quantity represented in Equation 16, above, may be simplified to:

$$W_k^{(\tilde{d})} = Y_k^{(\tilde{d})} H_k + \eta_k,$$  (Equation 18)

where $\eta_k \approx CN(0, \sigma_\eta^2)$. Using these assumptions and the first order approximation that $E[|\eta_k|^2 |\hat{X}_k|^2 H_k] \approx \sigma^2$ for $k \in K_d$, the symbol estimate MSE may be determined according to the equation:

$$E[|\hat{X}_k - X_k|^2 | H_k] \approx \frac{\sigma^2}{|H_k|^2} \cdot \left(\frac{(1-\beta)|K_P|}{\beta(1-\rho)|K_d|} + \frac{|K_P|}{\beta\rho|K_d|} + \frac{1}{1-\rho}\right).$$  (Equation 19)

As Equation 19 indicates, the MSE is dependent on the ratio of pilot to data subcarriers $|K_p|/|K_d|$. Also, the minimizing the pilot subcarrier power is achieved by setting $\beta=1$ when perfect synchronization is assumed. However, in an embodiment, $\beta$ is selected such that, $\beta<1$, in order to achieve desired synchronization performance.

Channel estimator/corrector 616 may then generate an equalized combined signal 654 by equalizing the channel effects based on the channel estimate. After the various offset and channel corrections, the equalized combined signal 654 may be represented as:

$$z^{(\tilde{d})}[n] = ((f_{PA}(y^{(\tilde{d})}[n-n_0])*h[\tau])e^{-j2\pi \in/N} + \eta[n])e^{j2\pi \hat{\in}/N}.$$  (Equation 20)

SPS removal element 618 includes computational apparatus adapted to receive the equalized combined signal 654, and to remove the scaled SPS 662 corresponding to the SLM index estimate 640 from the equalized combined signal 654 (e.g., to combine $-\sqrt{\rho} s_k^{([|\$]\$^-\$\$[|\$]\$^-A\tilde{X}\tilde{d})}$ with the equalized combined signal 654) in order to produce an estimated, phase shifted data signal 664. In an embodiment, the scaled SPS 662 may be obtained by retrieving the SPS $s_k^{([|\$]\$^-\$\$[|\$]\$^-A\tilde{X}\tilde{d})}$ corresponding to the SLM index estimate 640 from a table of SPS, which is accessible to or stored in receiver 600, and by applying the scaling factor $\sqrt{\rho}$ to the retrieved SPS. The SPS table includes one or more pre-generated sets of SPS, where each SPS in a set may be referenced by an SLM index. Each SPS in the receiver's SPS table is represented in the frequency domain, in an embodiment. In an embodiment, each SPS includes synchronization information and pilots, and those pilots may have variable pilot signal parameters (e.g., variable pilot spacing and/or pilot power). In an alternate embodiment, the synchronization information and pilots may be separately represented.

Scaling element 620 is adapted to apply a scaling factor to the estimated, phase shifted data signal 664, in order to produce a scaled, phase shifted data signal 666, which has a peak amplitude approximately equal to that of the original input data, X[n]. Phase shift element 622 includes computational apparatus adapted to phase shift the scaled, phase shifted data signal 666 by a phase shift value 668 corresponding to the SLM index estimate 640 (e.g., to shift the scaled, phase shifted data signal 666 by $e^{-j\Phi^{\{{\tilde{d}}|\hat{s}\hat{s}\hat{s}[\hat{s}]\hat{s}\,A\bar{X}d\}}}$). The remaining signal is demodulated in order to produce the output data symbol 580, $\hat{X}_k[n]$. When the SLM index estimate 640 represents a correctly-detected SLM index (e.g., an SLM index corresponding to the selected signal 346, FIG. 3, identified at the transmitter 300), then blind phase sequence detection has been robustly performed by receiver 600, and the output data symbol 580 reflects an accurate estimate of the input data symbol (e.g., input data symbol 320, FIG. 3).

As discussed in detail above, both a transmitter (e.g., transmitter 300, FIG. 3) and a receiver (e.g., receiver 600, FIG. 6) have access to at least one set of pre-generated SPS. Embodiments of methods for determining pilot parameters for pilots included within the SPS will be described in more detail later in conjunction with FIG. 7, and embodiments of methods for generating sets of SPS will be described in more detail later in conjunction with FIG. 8. Pilot signals having variable pilot signal parameters and sets of SPS generated in accordance with various embodiments may result in significant PAR reductions and may have improved synchronization and channel estimation properties, when compared with traditional methods.

According to an embodiment, generating an SPS that results in significant PAR reductions are achieved when IDFT$\{S_k^{(d)}\}=s^d[n]$ has low PAR. In this case, the combined sequence $y^{(d)}[n]=\sqrt{\rho}s^{(d)}[n]+\sqrt{1-\rho}x^{(d)}[n]$ may, on average, have lower PAR than $x^{(d)}[n]$. The magnitude of PAR reduction depends on the value of the embedding factor, $\rho$, where larger PAR reductions may be achieved when $\rho$ has a relatively large value (e.g., when $\rho>0.6$, and smaller PAR reductions may be achieved when $\rho$ has a relatively small value (e.g., when $\rho<0.6$). In an embodiment, a value for $\rho$ may derived assuming perfect acquisition by minimizing the maximum symbol estimate in $E[|x_d|^2]$, or $MSE_x$, where $MSE_x=E[|\hat{X}_d-X_d|^2]$. Using various embodiments, an SPS may be generated to have a PAR<0.5 dB, although embodiments may be implemented in which an SPS has a PAR≧0.5 dB, as well.

In addition, wireless signals that include pilot signals with variable pilot signal parameters and/or SPS generated according to an embodiment may have excellent synchronization properties. As discussed previously, synchronization includes estimating the SLM index, $\bar{d}$, for the transmitted signal, estimating a coarse timing offset, $n_0$, and estimating a coarse CFO, $\hat{\epsilon}$. An estimation of which phase sequence index, $\bar{d}$, was transmitted may be made via criterion specified in Equation 11, above. From Equation 11, it is apparent that correct estimation of $\bar{d}$ depends on the peaks of $|r^{(d)}[u]|$ for $d\neq\bar{d}$ (i.e., spurious correlation peaks). When the spurious correlation peaks all are less than the peak in $|r^{(\bar{d})}[u]|$, $\bar{d}$ will be correctly detected. Accordingly, in an embodiment, variable pilot signal parameters are determined and sets of SPS are generated so that spurious correlation peaks are low, when compared with the peak in $|r^{(\bar{d})}[u]|$.

Assuming that $x^{(d)}[n]$ is independent of $s^{(d)}[n]$, the peaks in $|r^{(d)}[u]|$ when $d\neq\bar{d}$ are dictated by the peaks of the conjugate correlation $CC\{s^d[n], S^q[n]\}$ for $d\neq q$. In an embodiment, a set of SPS is generated so that $\max_{u,d\neq q}CC\{s^d[n], s^q[n-u]\}$ is minimized using an optimization procedure. In an alternate embodiment, a set of SPS may be generated more simply according to the following equation:

$$\left[\max_{u,d\neq q} CC\{s^{(d)}[n], s^{(q)}[n-u]\}\right] < th_{cross}, \quad \text{(Equation 21)}$$

where $th_{cross}$ is a predetermined threshold. More particularly, in an embodiment, $th_{cross}$ is a threshold that is determined to provide adequate system performance by considering an optimal or near-optimal balance between the synchronization detection performance (e.g., a probability of missing a synchronization signal and a probability of falsely detecting a synchronization signal when none is present), the estimation quality (e.g., mean square error (MSE) or other quality estimation quantities) of the timing, frequency, and phase estimation performance for synchronization, the channel estimation performance (e.g., MSE or other channel estimation quantities), and the receiver demodulator bit error rate (BER) performance. In an embodiment, $th_{cross}<0.1$, although $th_{cross}$ may be equal to or less than 0.1, in other embodiments.

As discussed previously, once $\bar{d}$ is detected, a coarse timing offset estimate (e.g., coarse timing offset estimate 642), $\hat{n}_0$, may be determined according to Equation 13, above. As Equation 13 indicates, the coarse timing offset estimate is determined based on the maximum of the $\hat{\bar{d}}$th conjugate correlation output. Although the channel estimator (e.g., channel estimator/corrector 616, FIG. 6) may compensate for differences $|n_0-\hat{n}_0|\leq L_{cp}-L_h+1$, where $L_h$ is the length of the channel and $L_{cp}$ is the length of the cyclic prefix, the SPS are generated, in an embodiment, to minimize this difference. According to Equation 13, above, no is determined based on the maximum of the $\hat{\bar{d}}$th conjugate correlation output, and it may be assumed that $\hat{\bar{d}}=\bar{d}$, $n_0$ may be detected correctly as long as $|r^{(\bar{d})}[n_0]|>r^{(\bar{d})}[n]$ for all $n\neq n_0$. In an embodiment, a set of SPS is generated so that $\max_{d,u\neq n_0}CC\{s^{(d)}[n],s^{(d)}[n-u]\}$ is minimized. In an alternate embodiment, a set of SPS may be generated more simply according to the equation:

$$\left[\max_{d,u\neq n_0} CC\{s^{(d)}[n], s^{(d)}[n-u]\}\right] < th_{self}, \quad \text{(Equation 22)}$$

where $th_{self}$ is a predetermined threshold (e.g., a threshold that is determined to provide adequate system performance). In an embodiment, $th_{self}<0.1$, although $th_{self}$ may be equal to or less than 0.1, in other embodiments.

In an embodiment, each SPS includes synchronization information and a plurality of pilot signals, and the SPS is embedded within a wireless signal prior to transmission, as discussed previously. In an alternate embodiment, a wireless signal may include synchronization information and pilot signals that are distinct from each other. Either way, embodiments include generating and communicating a wireless signal that includes a plurality of pilot signals that have variable pilot signal parameters (e.g., pilot spacing and/or pilot power). Such embodiments may be incorporated into currently-existing and/or emerging standards and/or protocols in which PSAM currently is employed with evenly-spaced, equal power pilots.

Embodiments include methods for determining pilot signal parameters (e.g., pilot signal positions and pilot signal power), where the pilot signal parameters are different for two or more pilot signals included within a wireless signal. As discussed previously, traditional techniques include generating and communicating wireless signals with evenly-spaced, equal-power pilot signals (e.g., pilot signals 421-428, FIG. 4). However, embodiments include generating and communicating wireless signals with unevenly-spaced and/or unequal power pilot signals (e.g., pilot signals 521-528, FIG. 5).

To outline a procedure for determining pilot signal parameters, a frequency domain symbol may be represented as $x=[x_1, x_2, \ldots, 0, 0, \ldots, 0, \ldots, x_{N-1}, x_N]^T$, where $x_k$ is chosen to be a scaled version of an element from a finite constellation in the complex domain $A=\{a_1, a_2, \ldots, a_{|A|}\}$ such that $E[\|x\|_2^2]=|K_p|+|K_d|$. The received baseband frequency-domain signal after synchronization and cyclic prefix (CP) removal is $y=\sqrt{\in_s}D_h x+w$, where w is additive white complex Gaussian noise (e.g., $w \approx CN(0, \sigma_n^2 I_N)$), and h is the frequency response of the channel. Note that $h=Q_L h^{(t)}$, where $h^{(t)}$ is a length-L vector of the channel impulse response and $Q_L$ is the first L columns of the DFT matrix Q.

Using the set of indices in x corresponding too the data carriers $K_d$ and the pilot carriers $K_p$, two matrices may be defined, $Q_d$ and $Q_p$, which transform the impulse response of the channel to the data and pilot subcarriers, respectively. Here, $[Q_p]_{k,n}=N^{-1/2}\exp(j2\pi(n-1)(k-1)/N)$, where $k \in K_p$ and $n \in \{1, 2, \ldots, L\}$, and $[Q_d]_{k,n}=N^{-1/2}\exp(j2\pi(n-1)(k-1)/N)$, where $k \in K_d$, $n \in \{1, 2, \ldots, L\}$.

Using a least-squares channel estimator, the MSE of the channel estimate in the data subcarriers may be approximated by $$z \approx \text{diag}\left\{\frac{\sigma_n^2}{\varepsilon_p} Q_d Q_p^+ D_{|x_p|^{-2}} Q_p^{H+} Q_d^H\right\},$$

where $x_p=[x]_k, k \in K_p$ (e.g., the modulated values in the pilot subcarriers). Furthermore, the maximum likelihood estimator of $x_d$ may be shown to have an MSE according to:

$$e = \text{diag}\left\{D_z + \frac{\sigma_n^2}{\varepsilon_d} I_{|K_d|}\right\}. \quad \text{(Equation 23)}$$

It can be shown that it is desirable to minimize the $\|e\|_\infty$ in order to reduce the symbol error rate (SER). Accordingly, in an embodiment, methods for determining variable pilot signal parameters that may produce optimal or near-optimal performance results include solving the following optimization problem:

$$\underset{E[|x|^2],\varepsilon_p,K_p}{\arg\min} \|e\|_\infty \quad \text{(Equation 24)}$$

subject to $$\varepsilon_p + \varepsilon_d = \varepsilon_s,$$

$$\|x_p\|_2^2 = |K_p|$$

$$E[\|x_d\|_2^2] = |K_d|$$

$$x_n = 0_{|K_n|\times 1},$$

where $\in_p$ is energy in the pilot subcarriers, $\in_d$ is the energy in the data subcarriers, $\in_s$ is total energy in the signal, $\|e\|_\infty$ is the $l^\infty$ norm of e, and $x_n$ are the null subcarriers.

As will be described in more detail below, and in accordance with an embodiment, by parameterizing the pilot positions, $K_p$, with a cubic polynomial, Equation 24 can be simplified to a problem with continuous inputs. Using further assumptions about the pilot positions, as will also be described in more detail below, it is possible to specify the pilot positions in two continuous variables $\delta$ and $a_3$, whose domain is bounded. $\delta$ a determines the positions of the pilots on the two edges of the passband, and $a_3$ is related to how the pilot spacing changes across the passband.

For an arbitrary set of pilot indices $\{k_1, k_2, \ldots, k_{|K_p|}\}$ the optimization problem:

$$\underset{|x_p|^{-2}}{\arg\min} \|z\|_\infty \quad \text{(Equation 25)}$$

subject to $$\|x_p\|_2^2 = \varepsilon_p |K_p|$$

$$K_p = \{k_1, k_2, \ldots, k_{|K_p|}\}$$

is convex and may readily be solved using conventional convex optimization methods. Finally, differentiating Equation 23 gives:

$$\varepsilon_p = \varepsilon_s \frac{\|z\|_\infty - \sqrt{\|z\|_\infty}}{\|z\|_\infty - 1} \text{ and} \quad \text{(Equation 26)}$$

$$\varepsilon_d = \varepsilon_s - \varepsilon_p.$$

In an embodiment, using these results, the method for selecting the variable pilot signal parameters may be reduced to a simple grid search over the domain of $(\sigma, a_3)$, as will be described below. Essentially, the optimization problem of Equation 24 is decomposed into four independent optimization problems, in an embodiment, which may be solved successively to find a near-optimal solution to Equation 24. These four independent optimization problems include: 1) performing a pilot position parameterization process to determine a set of pilot subcarrier indices, $K_p$, that make practical sense; 2) using the set of subcarrier indices, $K_p$, minimizing the channel estimate mean square error (MSE), z, in the pilot power, $|x_p|^2$ (assuming that the power in the pilot subcarriers is deterministic, so that $E[|x_p|^2]=|x_p|^2$); 3) using $K_p$ and $|x_p|^2$ from the previous determinations, finding the power allocated to the pilots, $\in_p$; and 4) minimizing the maximum symbol estimate MSE in $E[|x_d|^2]$.

Regarding the pilot position parameterization process of optimization problem 1, above, it may be possible exhaustively to search all the possibilities of $K_p$ to find the possibility that solves Equation 24 for small values of $|K_p|$ and $N-|K_n|$. However, when $|K_p|$ and $N-|K_n|$ become moderately large, searching the $$\binom{N-|K_n|}{|K_p|}$$

possibilities of $K_p$ becomes impractical. For example, with $N-|K_n|=192$ and $$L = 16 \binom{192}{16} \approx 10^{23}.$$

In an embodiment, the search space for $K_p$ is limited to a relatively small number of reasonable possibilities. In an embodiment, the pilot positions are parameterized by a cubic polynomial. Equal pilot spacing implies that the pilot positions may be described by a linear function (e.g., a first order polynomial). However, to allow uneven pilot spacing, pilot spacing is parametrically modeled using a low order polynomial (e.g., a cubic polynomial), in an embodiment. In a further embodiment, pilot positions are determined to be symmetric with respect to the center of the band. Accordingly, a quadratic polynomial design is not implemented, in an embodiment, because a second order polynomial may not be symmetric. In alternate embodiments, pilot positions are determined to be asymmetric with respect to the center of the band, and accordingly, a quadratic polynomial design may be implemented.

Assuming symmetry with respect to the center of the band, a cubic polynomial is used to determine pilot positions, in an embodiment. A one-to-one mapping is first determined, which relates the set of indices K to the set of subcarrier numbers, S. S may be considered to be a circularly shifted version of K with a domain in the integers of [N/2−1, N/2]. Specifically, S=f(K) where:

$$f(K) = ((K-N+1))_N - N/2 + 1. \quad \text{(Equation 27)}$$

If the domain of f is restricted to [1, N], then f is a one-to-one mapping so that $K = f^{-1}(S)$. With S, the data and pilot subcarrier numbers, $S_d \cup S_p$, are continuous over the integers. This may not be the case with K, because the null indices $K_n$ occupy the middle segment of x.

In an embodiment, a cubic function, $g(\cdot)$, is used, which maps the integers in $[0, |K_p|-1]$ to a set of possible pilot subcarrier numbers, $S_p$. Once $S_p$ is found through $g(\cdot)$, $f^{-1}(\cdot)$ is used to find $K_p$. Finally, $K_p$ is used to solve the segmented optimization problem discussed above. In an embodiment, this process is performed iteratively over all permissible values of:

$$K_p = \{\text{int}(f^{-1} \circ g(\tau)), \tau \in \{1, 2, \ldots, |K_p|\}\} \quad \text{(Equation 28)}$$

until the minimizing set is found.

In an embodiment, a cubic function that may parameterize the pilot subcarrier positions has the form:

$$g(\tau) = a_3 \tau^3 + a_2 \tau^2 + a_1 \tau + a_0. \quad \text{(Equation 29)}$$

The pilots are placed in non-null-subcarriers (e.g., in-band subcarriers). $g(\tau)$ is further constrained, in an embodiment, by assuming that the pilots are placed symmetrically about the center of the in-band region. In addition, an assumption is made that the pilots are placed from left to right, in an embodiment, such that $g(\tau)$ has a positive slope. To establish these constraints, a number of in-band subcarriers is defined as $N_i = |S_p \cup S_d|$. In an embodiment, $\text{int}(f^{-1} \circ g(\tau)) \notin K_n$, which means that $g(\tau) \in [-(N_i-1)/2, (N_i+1)/2]$. The middle of the in-band region is at ½. Mathematically, the constraint equations may be represented as:

$$g\left(\frac{|K_p|-1|}{2}\right) = 1/2 \quad \text{(Equation 30)}$$

$$g(0) = -(N_i-1)/2 + \delta \quad \text{(Equation 31)}$$

$$g(|K_p|-1) = (N_i+1)/2 - \delta| \quad \text{(Equation 32)}$$

$$g'(\tau) > 0, \quad \text{(Equation 33)}$$

where δ represents how far the edge pilots are from the in-band edges. For example, $\delta \in (0, 1]$ would mean the edge pilots are placed at the in-band edge, while $\delta \in (1, 2]$ would place the edge pilots one subcarrier from the in-band edge. Using the constraint equations in Equations 30-33 and a further constraint that the edge pilots should not be spaced further from the in-band edge than an average pilot spacing, three of the five variables of Equations 29-33 may be eliminated, and a domain for the remaining two variables may be defined so that:

$$a_0 = \delta - \frac{(N_i-1)}{2} \quad \text{(Equation 34)}$$

$$a_1 = \frac{a_3(|K_p|-1)^3 + 2N_i - 4\delta}{2(|K_p|-1)} \quad \text{(Equation 35)}$$

$$a_2 = \frac{-3a_3(|K_p|-1)}{2} \quad \text{(Equation 36)}$$

$$\frac{-2(N_i-2\delta)}{(|K_p|-1)^3} \leq a_3 \leq \frac{4(N_i-2\delta)}{(|K_p|-1)^3} \quad \text{(Equation 37)}$$

$$0 < \delta \leq \frac{N_i}{|K_p|}. \quad \text{(Equation 38)}$$

From Equation 36, when $a_3=0$, $a_2=0$ as well, which means that $g(\tau)$ of Equation 29 becomes a first order polynomial, and the pilot spacing becomes even. From Equations 29 and 36, it may be inferred that $$g''(\tau) = 6a_3\tau + 2a_2 = 6a_3\left(\tau - \frac{(|K_p|-1)}{2}\right).$$

Therefore, when $a_3<0$, pilot spacing increases as τ goes from $$0 \text{ to } \frac{(|K_p|-1)}{2},$$

meaning that the pilot spacing at the edges of the in-band region are more closely spaced than the pilot in the middle of the in-band region. Conversely, when $a_3>0$, the outer pilots have a larger spacing than the pilots near the middle of the in-band region.

The cubic parameterization procedure discussed above may result in the generation of a plausible set of pilot indices, $\{k_1, k_2, \ldots, k_{|K_p|}\}$. When $|K_p|=L$, then the following may be written:

$$z = \text{diag}\left\{\frac{\sigma_w^2}{\varepsilon_p} Q_d Q_p^{-1} D_{|x_p|^{-2}} Q_p^{H-1} Q_p^H\right\}. \quad \text{(Equation 39)}$$

When $|K_p|>L$, Equation 39 may be rewritten using pseudo-inverses as:

$$z = \text{diag}\left\{ \frac{\sigma_3^2}{\varepsilon_p} Q_d Q_p^+ D_{|x_p|^{-2}} Q_p^{H+} Q_p^H \right\}, \quad \text{(Equation 40)}$$

as long as the power in the power in the pilot subcarriers is constant. However, since the pilot power in each pilot subcarrier may not be the same as all other pilot subcarriers, according to an embodiment, the following approximation is appropriate to use:

$$z \approx \text{diag}\left\{ \frac{\sigma_w^2}{\varepsilon_p} Q_d Q_p^+ D_{|x_p|^{-2}} Q_p^{H+} Q_p^H \right\} \quad \text{(Equation 41)}$$

$$= \underbrace{\frac{\sigma_w^2}{\varepsilon_p} |Q_d Q_p^+|^2 |x_p|^{-2}}_{r},$$

where $Q_d Q_p^{-1}|^2$ is the element-wise magnitude square of the matrix $Q_d Q_p^{-1}$. From Equation 41, the channel estimate MSE, z, is linear in $|x_p|^{-2}$, which is the element-wise exponentiation of the vector. Accordingly, the $\ell^\infty$ norm of e is convex in $|x_p|^{-2}$. Thus, $|x_p|^{-2}$ and, equivalently $|x_p|$ can be found using:

$$\begin{array}{ll} \underset{|x_p|^{-2}}{\text{argmin}} & \|z\|_\infty \quad \text{(Equation 42)} \\ \text{subject to} & \|x_p\|_2^2 = |K_p| \\ & K_p = \{k_1, k_2, \ldots, k_{|K_p|}\}. \end{array}$$

Finally, using $$|x_p|^* = (|x_p|^{-2*})^{-1/2},$$

where $|x_p|^{-2*}$ is the solution from Equation 42, we have:

$$\begin{array}{ll} \underset{E[|x_d|^2], \varepsilon_p}{\text{argmin}} & \|e\|_\infty \quad \text{(Equation 43)} \\ \text{subject to} & \\ & \varepsilon_p + \varepsilon_d = \varepsilon_s, \\ & |x_p| = |x_p|^* \\ & E[\|x_d\|_2^2] = |K_d| \\ & K_p = \{k_1, k_2, \ldots, k_{|K_p|}\} \\ & x_n = 0_{|K_n| \times 1}, \end{array}$$

which may not be convex or easily solvable using standard optimization procedures.

In order to simplify Equation 43, the optimizing values $\in^*_p$ and $\in^*_d$ may be determined before determining how much power to allocate to individual subcarriers. The joint optimization of $\in_p$ and $\in_d$ may not be convex, and may be difficult to solve generally. In an embodiment, a method for determining $\in^*_p$ and $\in^*_d$ without knowledge of $E\lfloor|x_d|^2\rfloor$ is performed. Once $\in^*_p$ and $\in^*_d$ are solved, the optimizing value of $E\lfloor|x_d|^2\rfloor$ may be determined.

At this point, $E\lfloor|x_d|^2\rfloor$ is not known, and therefore it is difficult to formulate the problem in terms of a minimization of $\|e\|_\infty$. However, it is known that $E\lfloor\|x_d\|_2^2\rfloor = |K_d|$. To justify the use of $E\lfloor\|x_d\|_2^2\rfloor$, which is known, instead of $|K_d|E\lfloor|x_d|^2\rfloor$, which is unknown, in the optimization of the data and pilot power, an assumption is made, in an embodiment, that $|K_d|\|e\|_\infty$ and $\|e\|_1$ are interchangeable in the current context.

For properly chosen pilots, the range of channel estimate MSEs e should be relatively small. Over a small range of values, any infinitely differentiable function can be approximated with an affine function. In this case, the function of interest may be the function $f_s(\bullet)$, that relates the SER $p_s$ to the symbol estimate MSEs $[e]_k$ (e.g., $p_s = \Sigma_k f_s([e]_k)$). Using Jensen's inequality, a lower bound can be found to be $p_s \geq f_s(\Sigma_k [e]_k)$, and since the SER function is monotonic, an upper bound can be found to be $p_s \leq f_s(|K_d|\|e\|_\infty)$. With the knowledge that the elements of e may be relatively constant, an assumption may be made that the bounds are close so that $p_s \approx f(\Sigma_k [e]_k)$. Written out, the following may be expressed:

$$\sum_k [e] = \frac{\sigma_w^2}{\varepsilon_p} \|r^*\|_1 + \frac{\sigma_w^2}{\varepsilon_p} E[\|x_d\|_2^2], \quad \text{(Equation 44)}$$

where r is defined in Equation 41 and r* is the optimizing value of r where $|x_p| = |x_p|^*$. A goal is to minimize Equation 44 which, assuming the approximation holds, minimizes the SER.

Using simple calculus and the constraints $E\lfloor\|x_d\|_2^2\rfloor = \|K_d\|$ and $\in_p + \in_d = \in_s$, the pilot power may be found to be:

$$\varepsilon_p^* = \frac{\varepsilon_s(\|r^*\|_1 - \sqrt{|K_d|\|r^*\|_1})}{\|r^*\|_1 - |K_d|} \quad \text{(Equation 45)}$$

and the data power is $\in^*_d = \in_s - \in^*_p$. With $\in^*_p$, Equation 43 may be further simplified by eliminating the optimization variable $\in_p$. That is, the problem can be reduced to:

$$\begin{array}{ll} \underset{E[|x_d|^2]}{\text{argmin}} & \|e\|_\infty \quad \text{(Equation 46)} \\ \text{subject to} & \\ & \varepsilon_p^*, \varepsilon_d^*, |x_p|^* \\ & E\lfloor\|x_d\|_2^2\rfloor = |K_d| \\ & K_p = \{k_1, k_2, \ldots, k_{|K_p|}\} \\ & x_n = 0_{|K_n| \times 1}, \end{array}$$

which may be straightforward to solve using Lagrange multipliers, in an embodiment.

With all of the independent optimization problems discussed above having been put forward, and as mentioned above, an overall method of determining pilot signal parameters (e.g., pilot position and pilot power) may be implemented as a grid search over the domain of $(\delta, a_3)$, where the domain of $(\delta, a_3)$ is defined above in Equations 37 and 38. An embodiment of such a grid search is reflected in the flowchart of FIG. 7.

Figure 7:
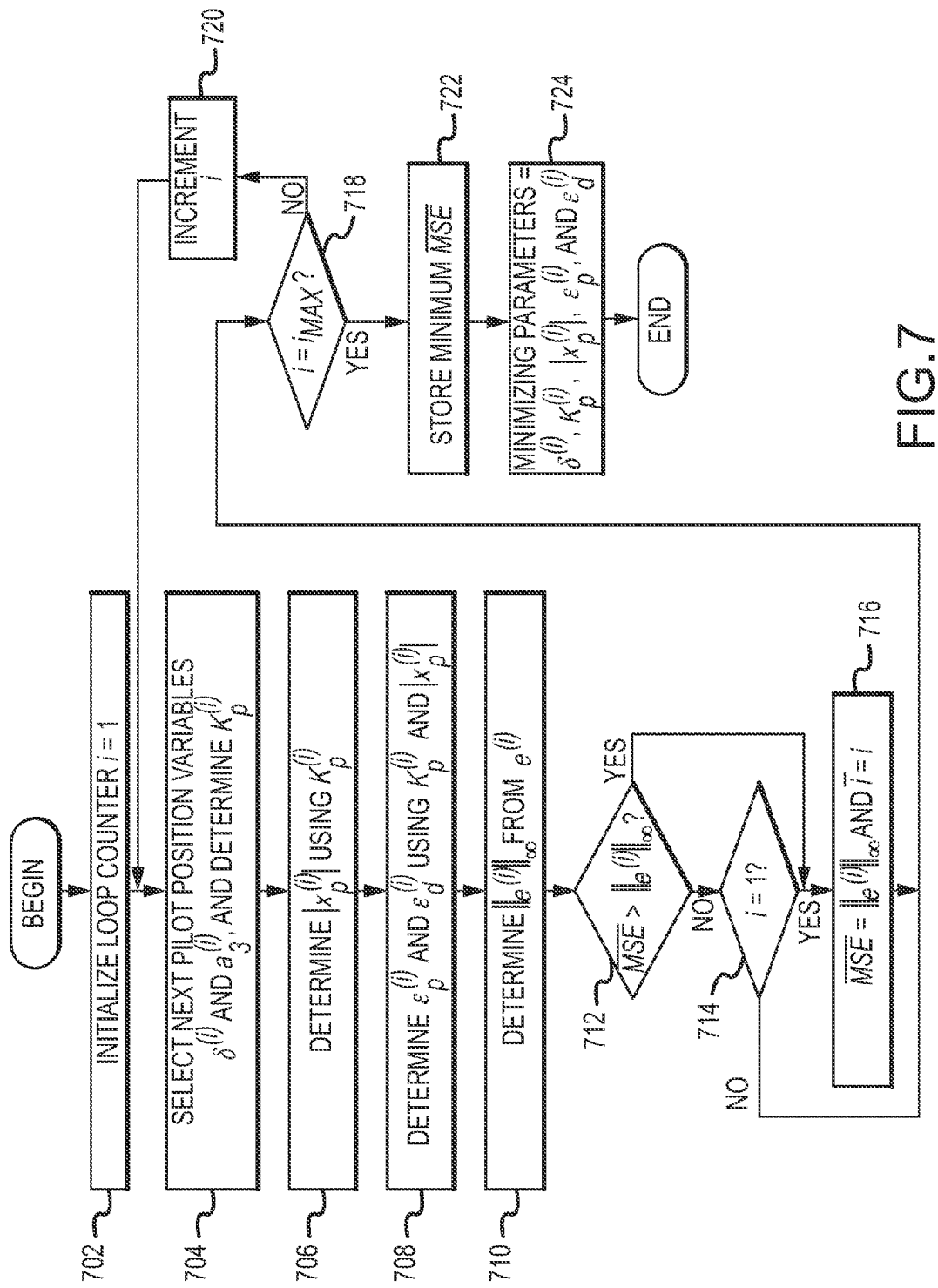
FIG. 7 is a flowchart of a method for determining pilot signal parameters, in accordance with an example embodiment.

FIG. 7 is a flowchart of a method for determining pilot signal parameters, in accordance with an example embodiment. More particularly, FIG. 7 is a flowchart of a method for determining pilot positions and pilot power for a plurality of pilot signals (e.g., pilot signals 521-528, FIG. 5). The method of FIG. 7 may be performed for each pilot signal for which pilot signal parameters are being determined. In an embodiment, the method includes an iterative grid search over a grid having a pre-determined resolution. Accordingly, the method may begin, in block 702, by initializing a loop counter, i. In an embodiment, the loop counter is initialized to a value of 1 and is incremented by 1 for each iteration being performed up to a value of $i_{max}$, where $i_{max}$ is an integer having a value that is dependent on the resolution of the grid search being performed (e.g., how fine of a grid the search is being performed over). Accordingly, for relatively coarse pilot optimizations, a relatively coarse grid search may be performed, and the value of $i_{max}$ may be relatively low. Conversely, for relatively precise pilot optimizations, a relatively fine grid search may be performed, and the value of $i_{max}$ may be relatively high. In an embodiment, $i_{max}$ has a value in a range between 10 and 3000, although $i_{max}$ may have a larger or smaller value, in other embodiments. In addition, the loop counter may be initialized to a value other than 1, in other embodiments, and/or may be incremented differently, or may be a decrementing counter, in alternate embodiments.

For each pilot signal for which pilot signal parameters are being determined, an iterative convergence process is performed. The number of iterations performed in the convergence process depends upon how quickly the MSE converges below $\|e^{(i)}\|_\infty$.

The iterative convergence process starts, in block 704, by selecting two pilot position variables, $\delta^{(i)}$ and $a_3^{(i)}$, in a domain defined by Equations 37 and 38, above. From the selected pilot position variables, a value for the subcarrier position index of the pilot, $K_p^{(i)}$, is determined using the selected pilot position variables and Equation 28, above.

In block 706, $|x_p^{(i)}|^*$ is determined using the value of $K_p^{(i)}$ determined in block 704 and Equation 42. In block 708, $\in_p^{(i)}$ and $\in_d^{(i)}$ are determined using the value of $K_p^{(i)}$ determined in block 704 and the value of $|x_p^{(i)}|$ determined in block 706 and Equation 45. Next, in block 708, $$E[|x_d|^2]^{(i)}$$

is determined using Equation 45. In block 710, when a least squares estimator (LSE) is used, $\|e^{(i)}\|_\infty$ may be determined from $e^{(i)}$ using Equation 23. Alternatively, when a Bayesian estimator is used, $\|e^{(i)}\|_\infty$ may be determined from $e^{(i)}$ using the autocorrelation matrix:

$$R_\varepsilon^{(b)} = D_{z(b)} + \frac{\sigma_w^2}{\varepsilon_d} D_{E[|x_d|^2]}^{-1}. \qquad \text{(Equation 47)}$$

In block 712, a determination is made whether $\overline{MSE} > \|e^{(i)}\|_\infty$. If not, a further determination is made, in block 714, whether i=1 (e.g., whether this is the first iteration of the convergence loop for the current pilot signal. If a determination is made that i≠1, then the method branches as shown in FIG. 7. Otherwise, if either $\overline{MSE} > \|e^{(i)}\|_\infty$ or i=1, then $\overline{MSE} = \|e^{(i)}\|_\infty$ and $\bar{i}=i$ in block 716.

In block 718, a determination is made whether $i=i_{max}$. If not, then the loop counter, i, is incremented by 1, in block 720, and the method returns to block 704 and iterates as shown until the grid search has been completed.

When a determination is made, in block 718, that $i=i_{max}$, then the minimum $\overline{MSE}$ is stored, in block 722, where the minimum $\overline{MSE}$ corresponds to a particular iteration, i. In addition, in block 724, the minimizing parameters are set to $\delta^{(i)}$, $K_p^{(i)}$, $|x_p^{(i)}|$, $\in_p^{(i)}$, and $\in_d^{(i)}$. The method then ends.

Figure 8:
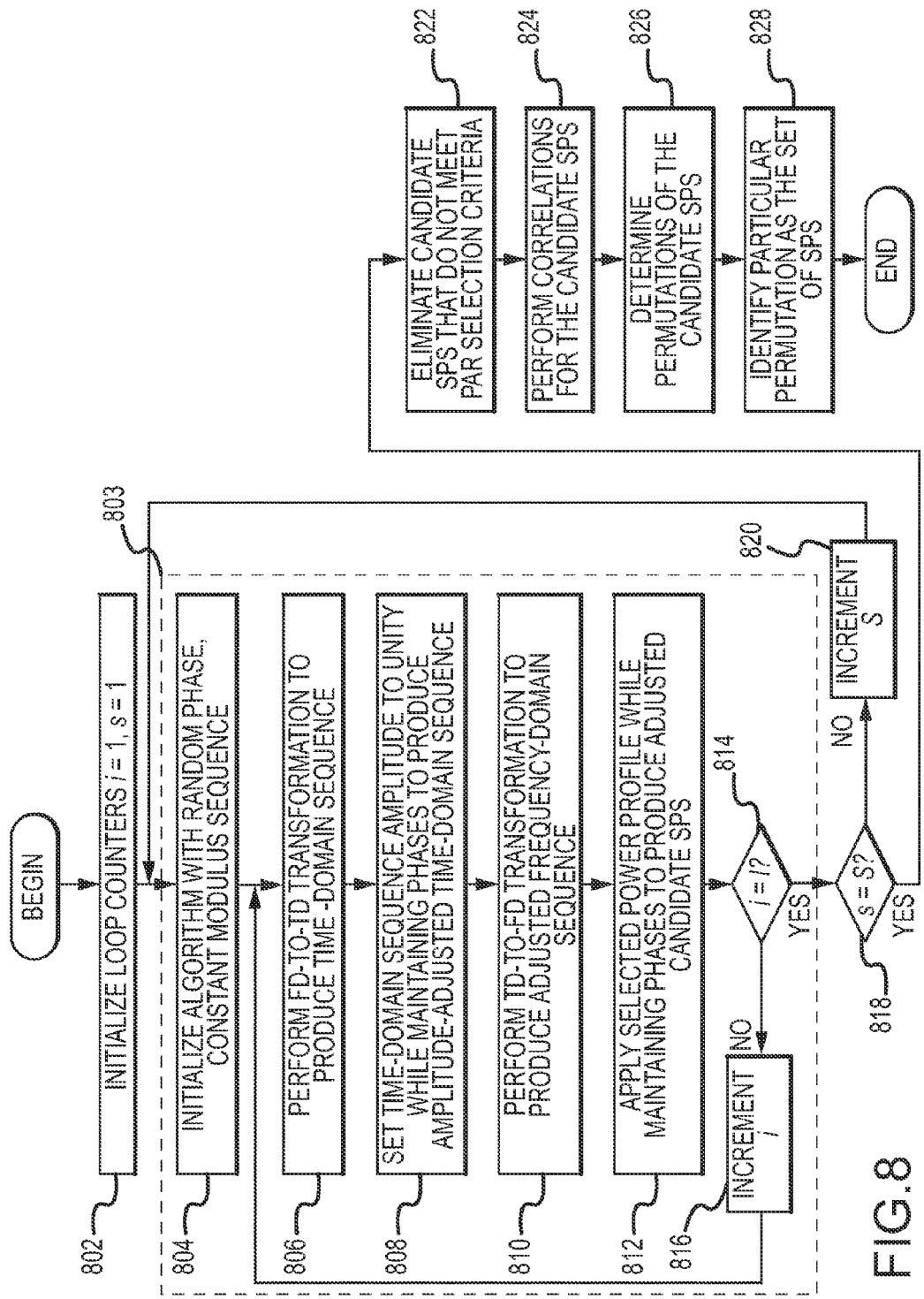
FIG. 8 is a flowchart of a method for generating a set of SPS, according to an example embodiment.

As discussed previously, pilot signals having variable pilot signal parameters determined according to embodiments described above may form portions of SPS within a set of SPS that are embedded by a transmitter into a transmit sequence. FIG. 8 is a flowchart of a method for generating a set of SPS, according to an example embodiment. The set of SPS may be used, for example, as a set of pre-generated SPS that are accessed by a transmitter (e.g., transmitter 300, FIG. 3) and a receiver (e.g., receiver 600, FIG. 6), as discussed previously in conjunction with FIGS. 3 and 6. A set of SPS may be represented, for example, as $\{s^{(d)}[n]\}_{d=1}^D$, where D is the number of SPS in the set, and d is a relational index that may be correlated, for example, with an SLM index or an SLM index estimate (e.g., SLM index estimate 640, FIG. 6). In an embodiment, the number of SPS in a set, D, is an integer having a value between 2 and 10, although a set of SPS may have more SPS, in other embodiments.

In an embodiment, each SPS in the set is generated by performing multiple iterations of a time-frequency projection (e.g., a Projection onto Convex Sets (POCS) algorithm), or an iterative convergence process based on PAR results and/or mean square error properties. In an embodiment, the number of iterations, I, is an integer having a value between about 100 and 300, although a smaller or larger number of iterations may be performed, in alternate embodiments. The flowchart of FIG. 8 includes an inner loop, which represents an iteration of a time-frequency projection (e.g., the inner loop is performed I times) in order to generate a single SPS, and an outer loop, which is performed S times in order to generate a set of S candidate SPS. Further steps of the method reduce the number of candidate SPS to a set of D SPS (e.g., D<S), as will be explained in detail below.

The method may begin, in block 802, by initializing an inner loop counter, i, and an outer loop counter, s. Inner loop counter, i, indicates a current time-frequency projection iteration being performed for the SPS being generated, and accordingly may be referred to as an iteration counter. In an embodiment, the inner loop counter is initialized to a value of 1 and is incremented by 1 for each iteration being performed up to a value of I, although the inner loop counter may be initialized to some other value, and/or may be incremented differently, or may be a decrementing counter, in alternate embodiments.

Outer loop counter, s, indicates which candidate SPS in a set is being generated, and accordingly may be referred to as an SPS number counter. In an embodiment, the outer loop counter is initialized to a value of 1 and is incremented by 1 for each candidate SPS being generated up to a value of S, although the outer loop counter may be initialized to some other value, and/or may be incremented differently, or may be a decrementing counter, in alternate embodiments.

The group of blocks 803 are executed in order to generate a single candidate SPS. As mentioned previously, generation of a candidate SPS includes using an iterative time-frequency projection algorithm (e.g., a POCS algorithm). For each candidate SPS, the algorithm is initialized using different initial conditions (e.g., a different random phase) from the other candidate SPS that are generated. Accordingly, generation of a candidate SPS may begin, in block 804, by initializing the algorithm, which includes generating an initial, random phase, constant modulus phase sequence, to which a pre-determined power profile is applied. In an embodiment, the random phase is determined by choosing a uniformly generated random phase between 0 and $2\pi$ radians or between $-\pi$ and $\pi$ radians. The actual generation of the phase may be performed using a uniform random number generator between 0 and 1 inclusive (e.g., denoting as $r_u$), and applying the randomly generated number to a complex phasor of form $\exp(j2\pi r_u)$, in an embodiment.

The power profile that is applied to the phase sequence is determined by computing a desired amplitude for each subcarrier, where the amplitudes for the subcarriers are computed to provide a lowest symbol MSE performance at the receiver, in an embodiment. More particularly, the power profile for the pilot subcarriers (and/or the indices for the pilot subcarriers) may be determined using methods such as those described above, according to various embodiments. The power profile is applied by multiplying the desired amplitudes by the subcarrier value generated in the inner loop of FIG. 8 (e.g., in block 804), in order to produce a power-adjusted phase sequence. In an embodiment, the applied power profile is the same for all SPS generated in the set. The length of the frequency-domain sequence is in a range of 32 to 256 values, in an embodiment, although shorter or longer sequences may be generated, in alternate embodiments.

In block 806, a time-domain transformation is performed on the initial, power-adjusted phase sequence to produce a time-domain sequence. The time domain-to-frequency domain transformation may include a Fourier transform or, more particularly, a discrete Fourier transform (DFT), in various embodiments, although other types of time domain-to-frequency domain transformations may be performed in other embodiments.

In block 808, amplitudes of the time-domain sequence are set to unity while maintaining phases of the time-domain sequence to produce an amplitude-adjusted time-domain sequence. More particularly, given that the time domain version may not be unity in amplitude, the sequence is converted to magnitude and phase (i.e., polar form). The magnitude of the converted sequence is set so that the amplitude is unity, while the original phase is retained. The converted sequence is then converted back to real and imaginary (i.e., rectangular form) to produce the amplitude-adjusted time-domain sequence.

In block 810, a frequency-domain transformation is performed on the amplitude-adjusted time-domain sequence to produce an adjusted frequency-domain sequence. The frequency domain-to-time domain transformation may include an inverse Fourier transform or, more particularly, an inverse discrete Fourier transform, in various embodiments, although other types of frequency domain-to-time domain transformations may be performed in other embodiments. In block 812, the power profile is applied to the adjusted frequency-domain sequence while maintaining phases of the adjusted frequency-domain sequence in order to produce an adjusted candidate sequence.

In block 814, a determination is made whether the last iteration has been performed for the candidate SPS being generated (e.g., whether i=I). If not, then the inner loop counter is incremented (e.g., by 1), in block 816, and the method iterates as shown by repeating blocks 806-814 at least an additional time using the adjusted candidate sequence.

When the last iteration has been performed, then the then-current adjusted candidate sequence represents a completed version of a candidate SPS. A determination may then be made, in block 818, whether the last candidate SPS has been generated in the set of candidate SPS (e.g., whether s=S). If not, then the outer loop counter is incremented (e.g., by 1), in block 820, and the method iterates as shown by repeating blocks 804-818 until the last candidate SPS has been generated.

When the last SPS has been generated, a subset of D candidate SPS may be selected, via blocks 822, 824, 826, and 828, which will represent the set of SPS being generated according to the method of FIG. 8. In block 822, certain candidate SPS that were generated via blocks 804-820 may be eliminated from the set of candidate SPS. In an embodiment, candidate SPS are eliminated that do not meet a PAR selection criteria (e.g., a selection criteria based on PAR). For example, in a particular embodiment, the PAR selection criteria may be a PAR threshold, $th_{PAR}$, and those candidate SPS having a PAR value that is greater than (or is equal to or greater than) the PAR threshold may be eliminated from the set of candidate SPS. In other words, when $(\max|s^{(s)}[n]|) > th_{PAR}$ for a candidate SPS, the candidate SPS may be eliminated. A PAR threshold may have a value in a range between about 0 dB and about 2.0 dB, in an embodiment, although the PAR threshold may be smaller or greater than the values within the above-given range, in other embodiments. In other embodiments, an inclusion process (rather than an exclusion process) may be performed, in which those candidate SPS having a PAR value that is less than a PAR threshold may be allowed to remain within the set of candidate SPS. In still another embodiment, block 822 may be excluded altogether from the SPS set generation method.

In block 824, a plurality of correlations are performed among the candidate SPS (e.g., the candidate SPS that remain after block 822) to generate a plurality of correlation values. In a particular embodiment, performing the correlations includes performing a plurality of cross-correlations among the candidate SPS to generate a plurality of cross-correlation results, and also performing a plurality of auto-correlations among the candidate SPS to generate a plurality of auto-correlation results. In an embodiment, $P^2$ cross-correlations are performed, where P is a number of candidate SPS being correlated. In other words, each candidate SPS is correlated with each other candidate SPS in order to generate $P^2$ cross-correlation results. Each cross-correlation result represents a maximum peak for the cross-correlation, and may be represented by $$\max_{\tau \neq 0}|s^{(s)}[n] \otimes s^{(s)}[n+\tau]|.$$

In addition, in an embodiment P auto-correlations are performed (e.g., an auto-correlation for each of the P candidate SPS being correlated), and the secondary maximum peak from each auto-correlation is determined as an auto-correlation result. Accordingly, P auto-correlation results are determined. An auto-correlation result corresponding to the secondary maximum peak may be represented by $\max|s^{(s)}[n] \otimes s^{(q \neq s)}[n+\tau]|$. A desired correlation output typically produces a notable peak, where any secondary peak is very low in comparison. In an embodiment, this correlation property is exploited for the purpose of detecting whether a signal is present. In addition, information at the correlation peak(s) is used to determine parameters such as timing offset and frequency offset, for example. The max cross-correlation results are used to determine at what probability a sequence other than the desired sequence may be chosen, where an inaccurate choice may result in synchronization detection errors and subsequent phase sequence detection errors. The maximum auto-correlation performance results are used to determine at what probability an incorrect peak of the correlation output may be chosen, where an inaccurate choice may result in estimation errors in timing and frequency offset, for example.

In block 826, which may be performed earlier in other embodiments, a plurality of permutations of sets of candidate SPS are determined. In an embodiment, each permutation includes a different combination of D SPS selected from the set of candidate SPS. Permutations may be determined for each possible combination of SPS, although in other embodiments, a smaller number of permutations may be determined.

In block 828, a permutation is identified, from the plurality of permutations, as a selected set of SPS (e.g., the end result of the SPS set generation method). In a particular embodiment, the identified permutation corresponds to the permutation having a smallest maximum max-correlation value (e.g., the set that gives the smallest maximum cross-correlations within the set and/or the smallest secondary peak in the auto-correlations in the set). In an embodiment, identifying the selected permutation from the plurality of permutations includes identifying a permutation that corresponds to a maximum cross correlation threshold and/or a maximum secondary peak of the auto-correlations. In general, a low secondary peak indicates a more definitive result for each auto-correlation, and the same is true for a maximum cross-correlation (e.g., one would desire the maximum peak of the cross-correlation to be as small as possible). After identifying the permutation, the method may then end.

Figure 9:
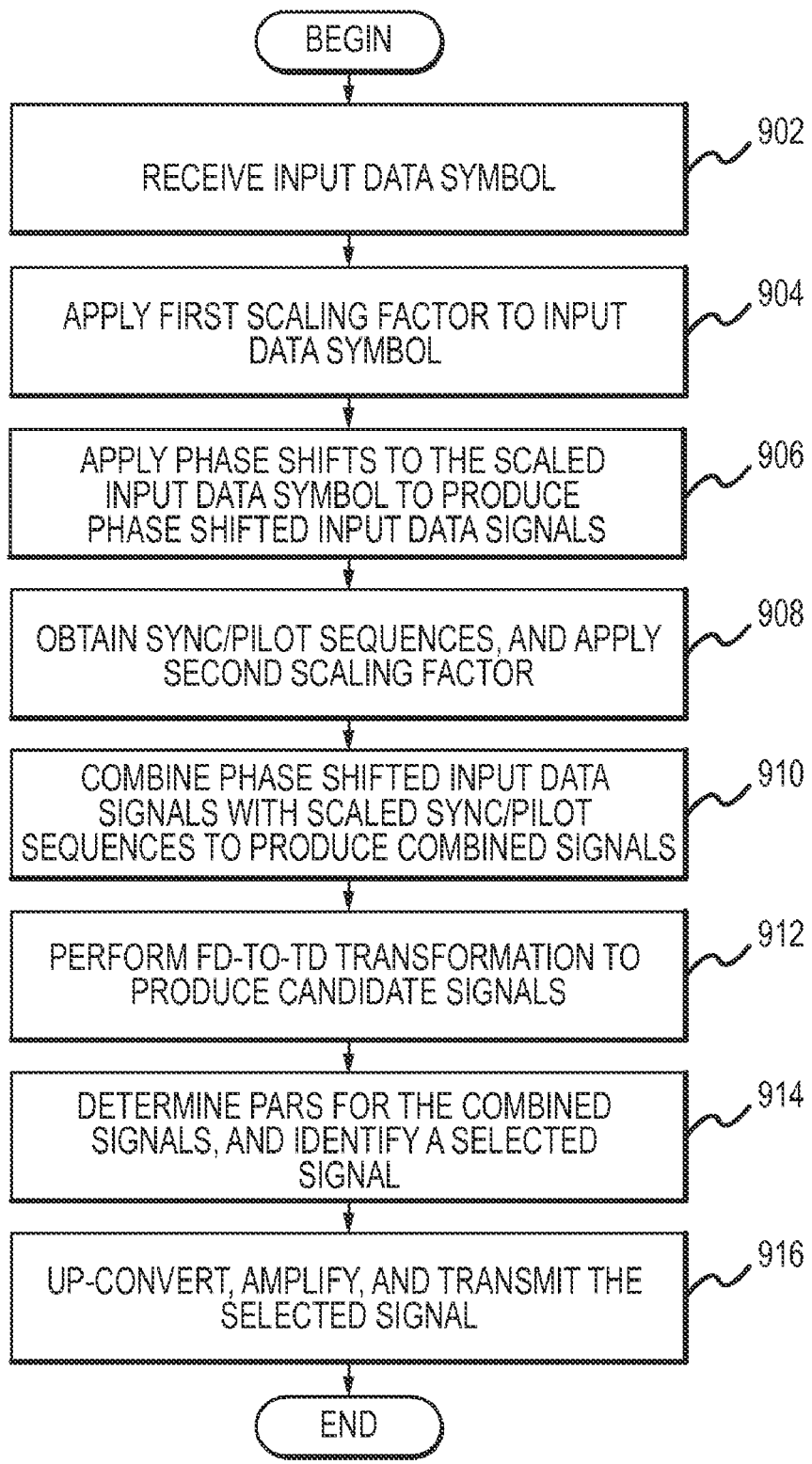
FIG. 9 is a flowchart of a method for generating and transmitting wireless signals that include pilot signals having variable pilot signal parameters, in accordance with an example embodiment.

FIG. 9 is a flowchart of a method for generating and transmitting wireless signals that include embedded SPS, in accordance with an example embodiment. Embodiments of the method are only briefly discussed in conjunction with FIG. 9, as various details and alternate embodiments were discussed in more detail above.

Referring also to FIG. 3, the method may begin, in block 902, when a transmitter (e.g., transmitter 300) receives (e.g., by data/scaling factor combiner 302) an input data symbol (e.g., input data symbol 320). In block 904, a first scaling factor (e.g., first scaling factor 322) may be applied to the input data symbol, in order to produce a scaled input data symbol (e.g., scaled input data symbol 324). As discussed previously, the first scaling factor may have a value of $\sqrt{1-\rho}$, where $\rho$ is an embedding factor having an absolute value between 0 and 1. In other embodiments, the first scaling factor may have a different value. In block 906, various different phase shifts (e.g., phase shifts 326) are applied (e.g., by phase shifters 304) to the scaled input data symbol, in order to produce a plurality of phase shifted input data signals (e.g., phase shifted input data signals 328).

In block 908, a plurality of SPS (e.g., SPS 332) are obtained (e.g., a plurality of SPS generated according to an embodiment), and a second scaling factor (e.g., second scaling factor 330) is applied to the plurality of SPS in order to produce a plurality of scaled SPS (e.g., scaled SPS 334). As discussed previously, the second scaling factor may have a value of $\sqrt{\rho}$, in an embodiment, although the second scaling factor may have a different value, in other embodiments. Preferably, but not essentially, the second scaling factor has an inverse mathematical relationship with the first scaling factor (e.g., by varying the value of the embedding factor, as the second scaling factor value increases, the first scaling factor value decreases, and vice versa).

In block 910, each one of the plurality of phase shifted input data signals is combined (e.g., by data/SPS combiners 308) with one of the scaled SPS in order to produce a plurality of combined signals (e.g., combined signals 340). In block 912, a frequency domain-to-time domain transformation is performed (e.g., by FD-to-TD transformers 310) on each of the combined signals, in order to produce a plurality of candidate signals (e.g., candidate signals 342).

In block 914, peak-to-average ratios (PARs) are determined (e.g., by signal selector 312) for some or all of the candidate signals, and based on the peak-to-average ratios, a selected signal (e.g., selected signal 346) is identified from the candidate signals. As discussed previously, the selected signal may be identified as the candidate signal with the lowest PAR, in an embodiment. In block 916, the selected signal is up-converted (e.g., by up-converter 314), amplified (e.g., by power amplifier 316), and transmitted over the channel (e.g., channel 106, FIG. 1). Although not illustrated or discussed herein, those of skill in the art would realize that various other processes for conditioning, filtering, and/or processing the various signals prior to transmission also may be performed at various stages within the process of generating and transmitting the selected signal. Upon transmitting the selected signal, the method may then end.

Figure 10:
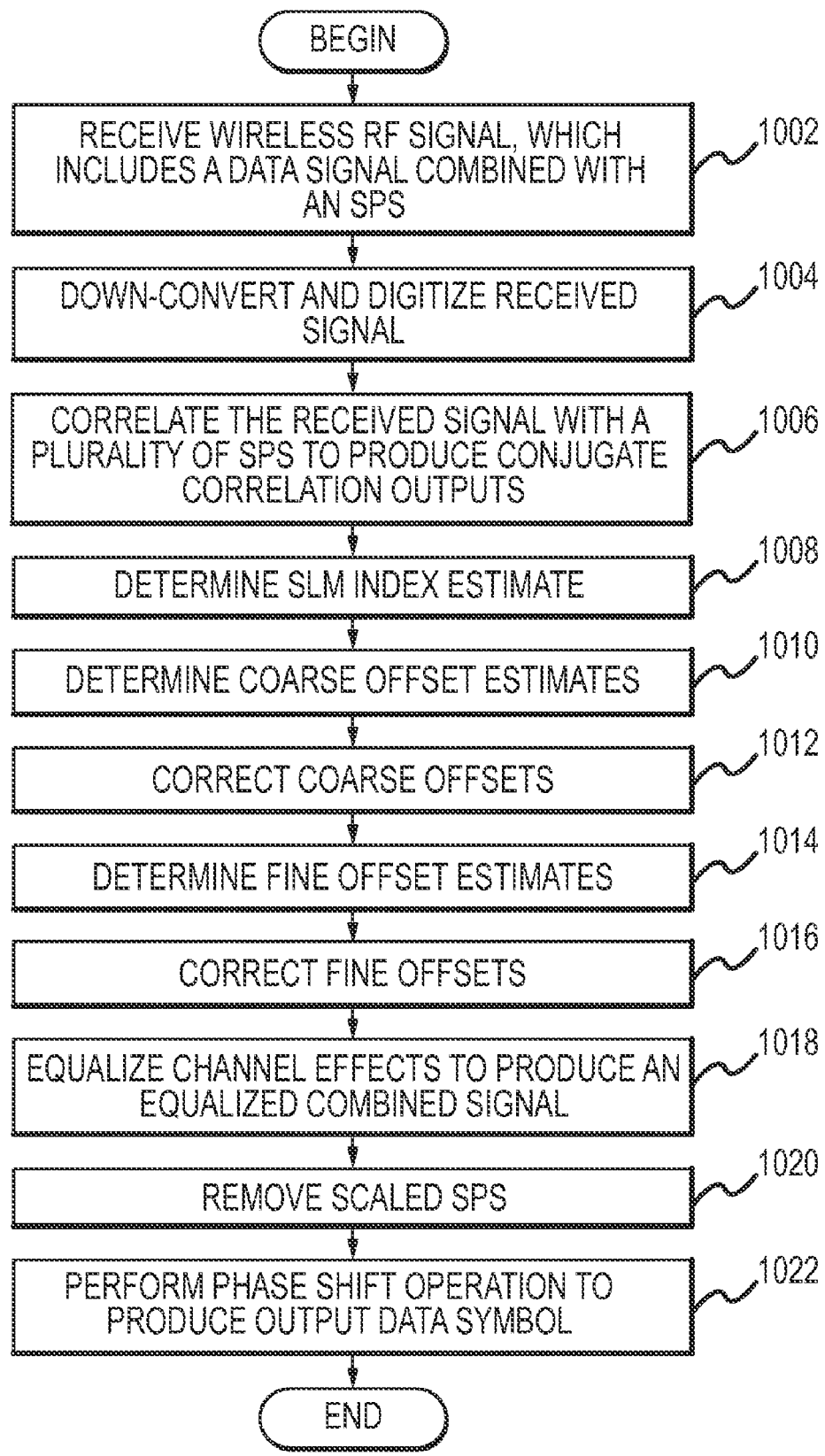
FIG. 10 is a flowchart of a method for receiving and processing wireless signals that include pilot signals having variable pilot signal parameters, in accordance with an example embodiment.

FIG. 10 is a flowchart of a method for receiving and processing wireless signals that include embedded SPS, in accordance with an example embodiment. Embodiments of the method are only briefly discussed in conjunction with FIG. 10, as various details and alternate embodiments were discussed in more detail above.

Referring also to FIG. 6, the method may begin, in block 1002, when a receiver (e.g., receiver 600) receives (e.g., via antenna 602) a wireless RF signal (e.g., RF signal 630) from the channel. The received RF signal includes a channel-affected version of a data signal combined with an SPS, as discussed in conjunction with the description of embodiments of the transmitter (e.g., transmitter 300, FIG. 3), and embodiments of the method for generating and transmitting the wireless RF signal (e.g., FIG. 7). In block 1004, the received RF signal is down-converted and digitized (e.g., by down-converter 632), in order to produce an IF or baseband received signal (e.g., received signal 634).

In block 1006, the received signal is correlated (e.g., by correlators 506) with a plurality of SPS (e.g., SPS 638 generated according to an embodiment) to produce a plurality of conjugate correlation outputs (e.g., conjugate correlation outputs 636). In block 1008, an SLM index estimate (e.g., SLM index estimate 640) is determined (e.g., by peak detector 508), based on the conjugate correlation outputs.

In block 1010, coarse offset estimates (e.g., coarse TO and coarse CFO) may be determined (e.g., by coarse offset estimator 610) based on the conjugate correlation output corresponding to the SLM index estimate. In block 1012, corrections are made (e.g., by offset corrector 612) for the coarse timing and carrier frequency offsets in the received signal, in order to produce a coarsely-corrected signal (e.g., coarsely-corrected signal 650). In block 1014, fine estimated offsets (e.g., fine CFO, fine TO, and/or phase offset) may be determined (e.g., by fine offset estimator 615) based on the coarsely-corrected signal, and in block 1016, additional corrections may be made (e.g., by offset corrector 612 in the time domain or by a frequency-domain offset corrector), in order to produce a finely-corrected signal (e.g., finely-corrected signal 651).

In block 1018, channel effects are estimated (e.g., by channel estimator/corrector 616) from a frequency-domain version of the finely-corrected signal. The finely-corrected signal is then equalized based on the estimated channel effects, in order to produce an equalized combined signal (e.g., equalized combined signal 654).

In block 1020, a scaled SPS (e.g., scaled SPS 662) corresponding to the SLM index estimate is removed (e.g., by SPS removal element 618) from the equalized combined signal, in order to produce an estimated, phase shifted data signal (e.g., estimated, phase shifted data signal 664), which may be scaled (e.g., by scaling element 520). A phase shift operation is performed (e.g., by phase shift element 522), in block 1022, which includes phase shifting the scaled, phase shifted data signal by a phase shift value corresponding to the SLM index estimate. This operation results in the production of an output data symbol (e.g., output data symbol 580), which reflects an estimate of the input data symbol (e.g., input data symbol 320, FIG. 3). The method may then end.

Figure 11:
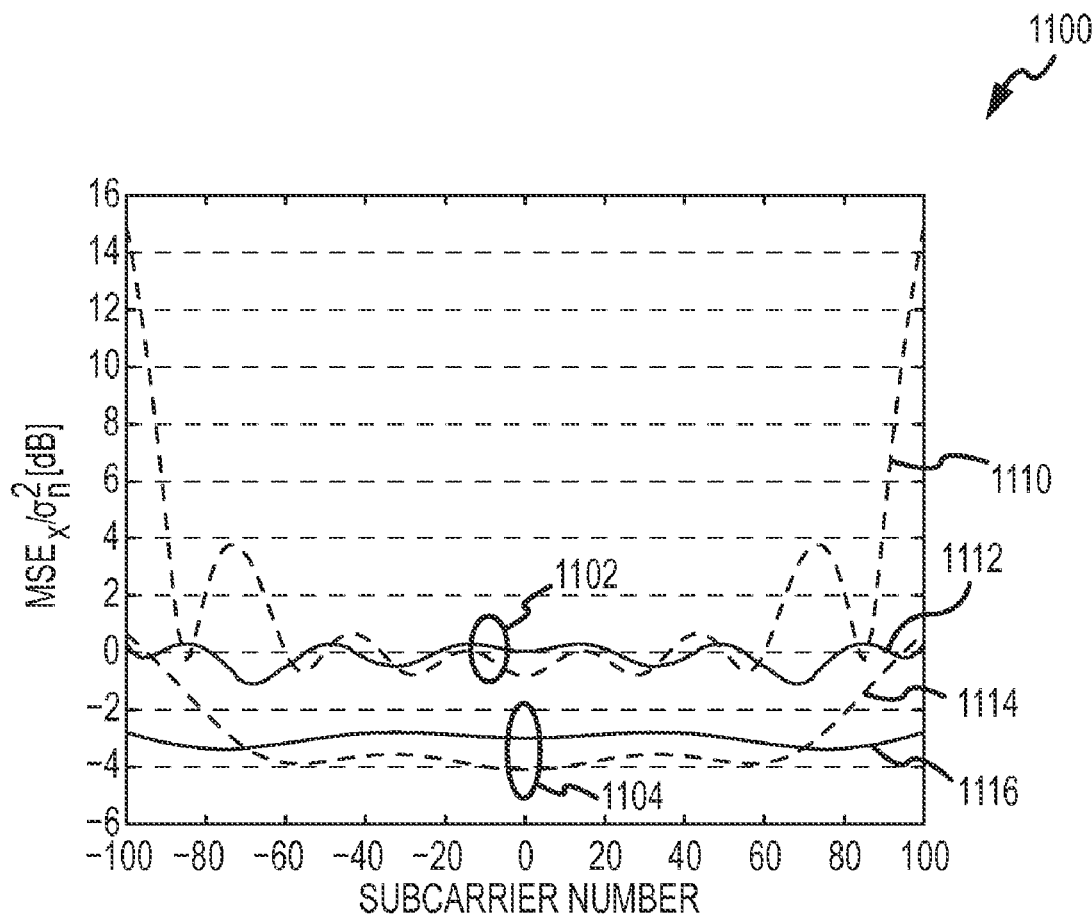
FIG. 11 is a chart comparing channel estimate mean square error (MSE) performance that may be achieved in an orthogonal frequency division multiplexing (OFDM) system using traditionally-designed pilots and using pilots designed in accordance with an example embodiment for two different channel lengths.
Figure 12:
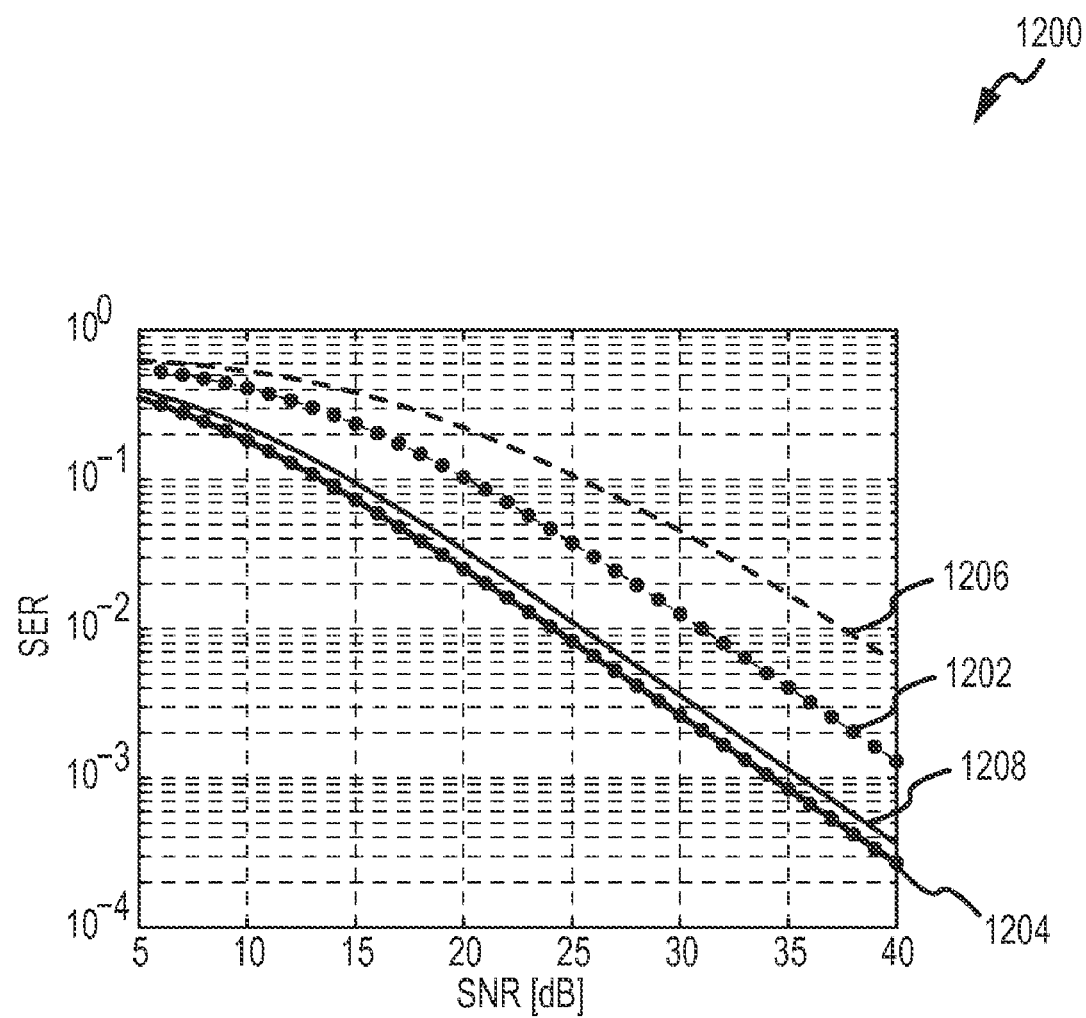
FIG. 12 is a chart plotting signal-to-noise ratio (SNR) versus symbol error rate (SER) performance that may be achieved in an OFDM system using traditionally-designed pilots and using pilots designed in accordance with an example embodiment for two different channel lengths.
Figure 13:
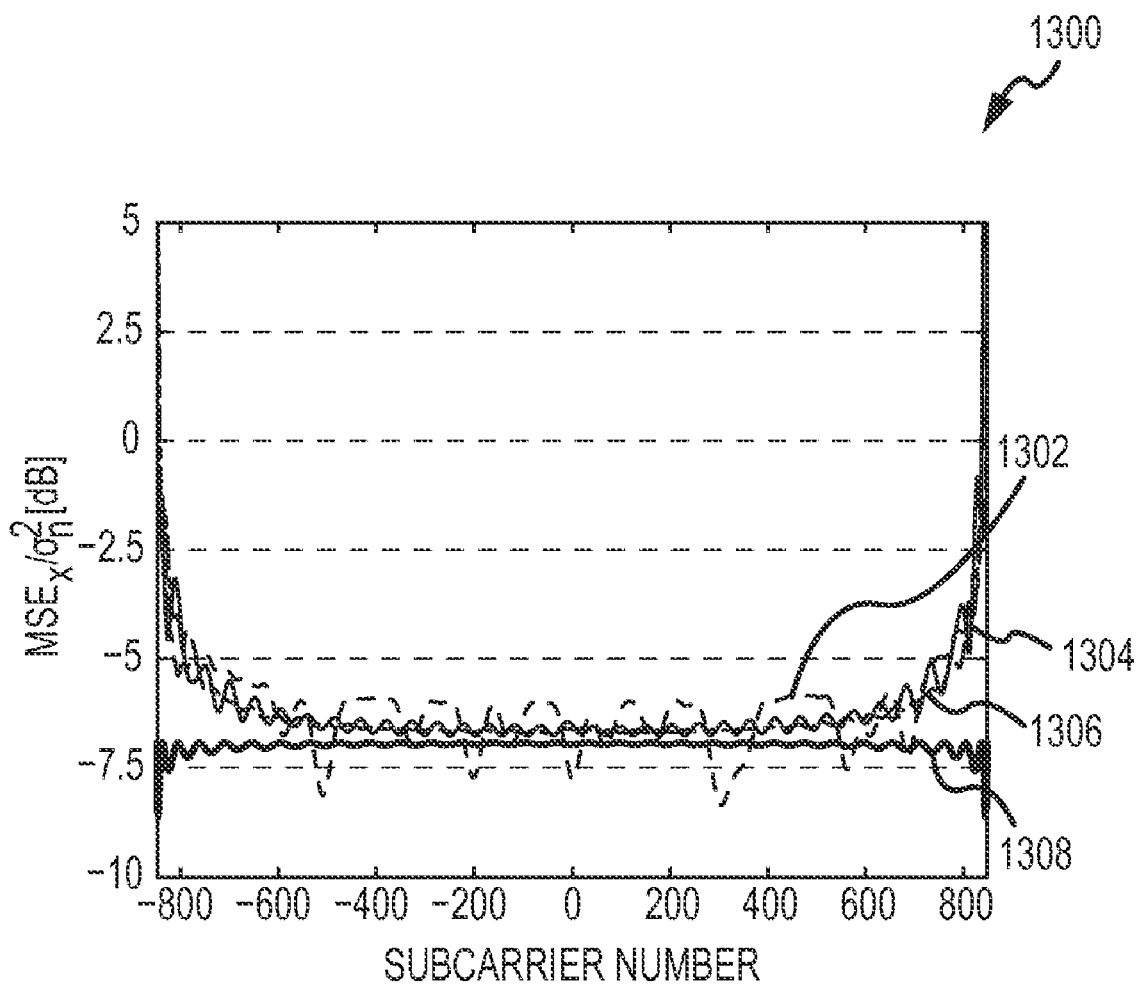
FIG. 13 is a chart comparing channel estimate MSE performance that may be achieved in an orthogonal frequency division multiple access (OFDMA) system using traditionally-designed pilots and using pilots designed in accordance with an example embodiment.
Figure 14:
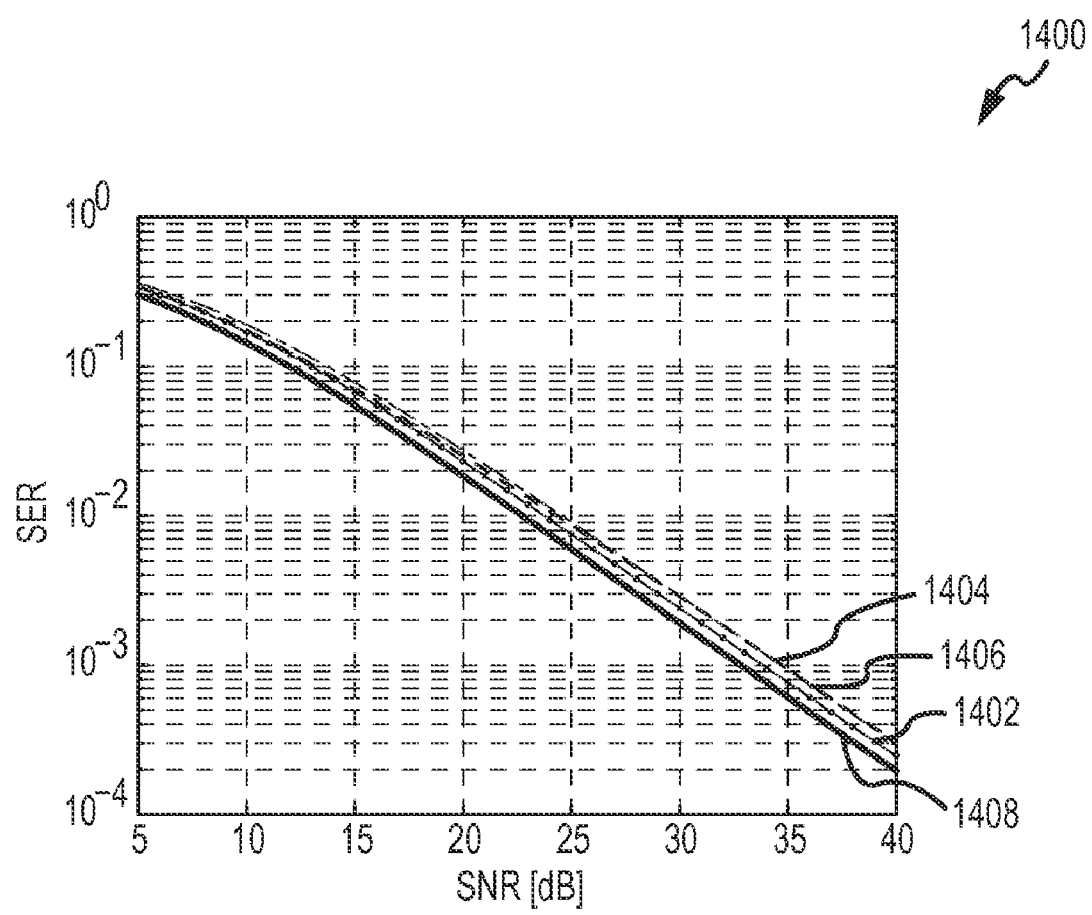
FIG. 14 is a chart plotting SNR versus SER performance that may be achieved in an OFDMA system using traditionally-designed pilots and using pilots designed in accordance with an example embodiment.

FIGS. 11-14 indicate potential simulated results for systems that employ various example embodiments. The description of the simulated results may include results obtained from signals generated according to conventional standards (e.g., IEEE 802.16a). However, it is to be understood that the comparison to these conventionally generated signals is not meant to imply that embodiments of the inventive subject matter are limited to implementations in systems that adopt these standards or variants thereof that may incorporate an embodiment in the future. The IEEE 802.16a standard includes three possible physical layer modes: Single carrier, OFDM, and OFDMA. FIGS. 11 and 12 compare performance results relating to an OFDM mode, and FIGS. 13 and 14 compare performance results relating to an OFDMA mode.

FIG. 11 is a chart 1100 comparing channel estimate mean square error (MSE) ($MSE_x/\sigma_n^2$) performance that may be achieved in an OFDM system using traditionally-designed pilots and using pilots designed in accordance with an example embodiment for two different channel lengths. More particularly, channel estimate MSE performance in an OFDM system that employs an IEEE 802.16a standard with evenly-spaced, equal power pilots is compared with channel estimate MSE performance in an OFDM system that employs unevenly-spaced, unequal power pilots according to an embodiment.

For IEEE 802.16a OFDM mode, the transmission frame is segmented into several parts. Of relevance in the current comparison are the preamble and the data-carrying parts of the frame. The preamble is used for synchronization purposes including channel estimation. Additionally, each data-carrying symbol contains several pilots, which can be used for fine synchronization and also for channel estimation. In a data-carrying symbol, 200 subcarriers of the 256 subcarrier window are used for data and pilots. Of the other 56 subcarriers, 28 are nulled in the lower-frequency guard band, 27 are nulled in the upper frequency guard band, and one is the DC subcarrier, which is also nulled. Of the 200 used subcarriers, 8 are allocated as pilots, while the remaining 192 are used for data transmission. The pilot positions specified by the standard are $K_{p,OFDM}$={−84, −60, −36, −12, 12, 36, 60, 84}, which all contain the same amount of power. Additionally, the pilot to data power ratio, $$\beta = \frac{\varepsilon_p}{\varepsilon_d},$$

is $\beta_{OFDM}$=1/24. After following a pilot design procedure according to an embodiment discussed above, the unevenly-spaced pilot positions may be specified as $K^*_p$={−100, −72, −43, −15, 15, 43, 72, 100} for L=4 and L=8, although it is to be understood that unevenly-spaced pilot positions alternatively may be determined, using other embodiments. For example, unevenly-spaced pilots may be positioned at indices within ±2 indices of the indices given in the previous sentence or at other positions, in other embodiments.

Referring to FIG. 11, plots 1102 compare MSE performance for L=8, and plots 1104 compare MSE performance for L=4. More specifically, plots 1110 and 1114 indicate MSE performance using evenly-spaced pilots, and plots 1112 and 1116 indicate MSE performance using unevenly-spaced pilots, according to an embodiment. A notable difference between the evenly-spaced pilots and the unevenly-spaced pilots is that the unevenly-spaced pilots place pilots at the edges of the guard band. In addition, in proximity to the edges of the pilot/data band, the pilot spacing is smaller than near the center of the band. Accordingly, in an embodiment, pilots are placed at the edges of the guard band. In a further embodiment, pilot spacing toward the edges of the guard band is smaller than near the center of the band. Using Equation 26, above, we have $\beta^*$=1.03 for L=8, and $\beta^*$=0.73 for L=4. In another embodiment, $\beta^*$ may be in a range of between about ±5% of the above given values. In other embodiments, $\beta^*$ may be in wider or narrower ranges than the ranges given above, and/or may have different values for different values of L. As FIG. 11 illustrates, unevenly-spaced pilots having spacing determined according to an embodiment result in improved channel estimates near the guard band. More particularly, FIG. 11 shows that the standard pilot design does a relatively poor job of estimating the channel in the subcarriers near the guard band. Conversely, the unevenly-spaced pilots designed according to an embodiment have relatively flat channel estimate MSE across all data subcarriers.

FIG. 12 is a chart 1200 plotting signal-to-noise ratio (SNR) versus symbol error rate (SER) performance that may be achieved in an OFDM system using traditionally-designed pilots and using pilots designed in accordance with an example embodiment for L=4 and L=8. In the illustrated example, the L channel taps are $$CN\left(0, \frac{1}{L}I_L\right).$$

Plots 1202 and 1206 indicate SNR performance using evenly-spaced pilots for L=4 and L=8, respectively, and plots 1204 and 1208 indicate SNR performance using unevenly-spaced pilots, according to an embodiment, for L=4 and L=8, respectively. FIG. 12 shows that, in an L-tap Rayleigh fading channel, unevenly-spaced pilots may result in about 13 dB SNR improvement when L=8 and about 7 dB SNR improvement when L=4.

The OFDMA mode in 802.16a is different from the OFDM mode discussed above. In the OFDMA mode, the transmission band is made up of 2048 subcarriers that are partitioned into two guard bands (consisting of null subcarriers) and 32 subchannels of 53 subcarriers each. Also, there are several main transmission options: uplink (UL), downlink (DL), and a third option known as adaptive antenna system (AAS), which may be employed when multiple transmit antennas are available. For the AAS option, the UL and DL carrier allocations are identical.

For the downlink, the DL channel goes from the base station (BS) to all of the individual subscriber stations (SSs). In the DL direction, an all-pilot preamble is not sent prior to the information symbols. Thus, it is reasonable to assume that the pilots contained in the information symbols may be used to estimate the channel. For the DL channel, the pilots are partitioned into a set of 32 constant pilots and a set of 142 pilots, whose positions depend on the symbol number (e.g., "symbol dependent pilots"). Also, the constant pilots are designed so that exactly 8 pilots from each set are the same for every symbol. Thus, in total there are $K_p$=166 pilots. In the left guard band, there are 173 subcarriers and in the right guard band, there are 172 subcarriers. The DC subcarrier also is nulled. Accordingly, in the data/pilot band, each of the 32 subchannels is made up of 48 contiguous non-pilot, non-DC subcarriers.

For the uplink, the subcarrier allocation is defined per subchannel and is different depending on the symbol number, which may take on values $S \in \{0, 1, \ldots, 12\}$. In each subchannel, the 53 subcarriers are numbered consecutively from 1 to 53. The pilot allocation for each subchannel is made up of 4 the pilots at base positions $K_{p,sub}^{(base)} = \{1, 14, 28, 41\}$, and one constant pilot at position 27. For symbol number S, the pilots are at positions $K_{p,sub} = K_{p,sub}^{(base)} + S$, and the constant pilot is at position 27, which means that each subchannel contains exactly five pilots regardless of the symbol number. For the UL direction, an all-pilot preamble is sent prior to the transmission of a burst of information symbols. Such a preamble symbol may be used for synchronization and channel estimation purposes. However, because there are also a large number of pilots contained in the information symbols, these pilots also may be used for channel estimation.

Unlike the standard UL and DL options, the pilot positions for the AAS option are all constant, regardless of the symbol number. Specifically, in each subchannel, the pilot positions are $\{6, 17, 29, 39, 50\}$. Similar to the standard UL and DL options, the DL direction in AAS does not use an all-pilot preamble, while the UL direction does.

The pilot designs for the UL and DL options are dependent on the symbol number, as discussed above. For comparison purposes, pilot designs for symbol number S=0 will be used for both options. In addition to pilot, the pilot amplitude also plays a role in the system performance. For each of the OFDMA pilot designs, the pilots all are modulated with values ±4/3, where the sign is chosen pseudo randomly. Thus, for the DL option, $\beta_{DL} \approx 0.185$, and for the UL and AAS options, $\beta_{AAS} = \beta_{UL} \approx 0.192$.

Using a pilot design procedure according to an embodiment, the specifications from the AAS and UL options were used for performance comparison purposes (e.g., $|K_p|=160$, $|K_n|=352$, and $|K_d|=1536$). The variable pilot signal parameters were determined according to an embodiment as $\beta^* = 0.452$ and $K^*_p = \{((int[-0.0006666x^3 + 0.159x^2 + 2.34x - 1200.15]))_N | x \in \{0, 1, \ldots, 159\}\}$. In other embodiments, the variable pilot signal parameters may be determined such that $\beta^*$ is within a range of about ±5% of 0.452, or within a wider or narrower range, and the unevenly-spaced pilots may be positioned at indices within ±2 indices of the indices given in the previous sentence or at other positions.

FIG. 13 is a chart 1300 comparing channel estimate MSE performance that may be achieved in an OFDMA system using traditionally-designed pilots and using pilots designed in accordance with an example embodiment. More particularly, channel estimate MSE performance in an OFDMA system that employs three IEEE 802.16a OFDMA options when the channel length is L=48.

In FIG. 13, channel estimate MSE performance for signals with evenly-spaced, equal power pilots are compared with channel estimate MSE performance in an OFDMA system that employs unevenly-spaced, unequal power pilots according to an embodiment. More particularly, plots 1302, 1304, 1306 correspond to channel estimate MSE performance for the DL, UL, and AAS options, respectively, and plot 1308 corresponds to channel estimate MSE performance for a signal that includes pilot signals with variable pilot signal parameters, according to an embodiment.

FIG. 14 is a chart 1400 plotting SNR versus SER performance that may be achieved in an OFDMA system using traditionally-designed pilots and using pilots designed in accordance with an example embodiment. More particularly, plots 1402, 1404, 1406 correspond to SER performance for the DL, UL, and AAS options, respectively, and plot 1408 corresponds to SER performance for a signal that includes pilot signals with variable pilot signal parameters, according to an embodiment. As FIGS. 13 and 14 illustrate, the pilot designs according to an embodiment outperforms the DL option (e.g., the best performing option of the DL, UL, and AAS options) by about 1 dB, and outperforms the UL and AAS options by about 1.8 dB.

Embodiments of methods and apparatus for determining pilot signals having variable pilot signal parameters for embedding in wireless signals have now been described. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

Those of skill in the art will recognize, based on the description herein, that various other apparatus and processes may be included in embodiments of the systems and methods described herein for conditioning, filtering, amplifying, and/or otherwise processing the various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with various types of computational apparatus, including but not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An embodiment includes a method for wirelessly communicating a signal. The method includes the step of generating a wireless signal that includes a guard band, data represented within a plurality of data-bearing subcarriers, and a plurality of pilot signals represented within a plurality of pilot subcarriers, where the plurality of pilot signals have variable pilot signal parameters. The method also includes transmitting the wireless signal over a wireless communication channel.

Another embodiment includes a method for wirelessly communicating a signal that includes the step of generating a wireless signal that includes a guard band, data represented within a plurality of data-bearing subcarriers, and a plurality of pilot signals represented within a plurality of pilot subcarriers, where the plurality of pilot signals have variable pilot signal parameters selected from a group of parameters that includes pilot power and pilot spacing with respect to adjacent pilots. The method also includes transmitting the wireless signal over a wireless communication channel.

Another embodiment includes a method with the step of receiving a received signal from a wireless communication channel, where the received signal represents a channel-affected version of a wireless signal that was transmitted by a transmitter. The wireless signal includes a guard band, data represented within a plurality of data-bearing subcarriers, and a plurality of pilot signals represented within a plurality of pilot subcarriers, and the plurality of pilot signals have variable pilot signal parameters selected from a group of parameters that includes pilot power and pilot spacing with respect to adjacent pilots. The method also includes the steps of producing a corrected signal by applying corrections to the received signal based on estimated channel perturbations within the received signal, which estimated channel perturbations are determined based on the plurality of pilot signals, and producing an output data symbol from the corrected signal.

Another embodiment includes a method for determining variable pilot signal parameters for a plurality of pilot signals of a wireless signal that includes a guard band and a passband, where the passband includes data represented within a plurality of data-bearing subcarriers and the passband also includes the plurality of pilot signals represented within a plurality of pilot subcarriers. The variable pilot signal parameters are selected from a group of parameters that includes pilot power and pilot spacing with respect to adjacent pilots. The method includes the step of performing a grid search over a domain of a first pilot position variable and a second pilot position variable, wherein the first pilot position variable determines positions of the pilot signals on two edges of the passband, and the second pilot position variable is related to how the pilot spacing changes across the passband. The method also includes the step of setting a minimizing parameter to $K_p^{(i)}$, where i corresponds to an iteration of the grid search having a minimum mean square error, and $K_p^{(i)}$ is a pilot subcarrier index.

Another embodiment includes a system with a transmitter adapted to generate a wireless signal that includes a guard band, data represented within a plurality of data-bearing subcarriers, and a plurality of pilot signals represented within a plurality of pilot subcarriers, where the plurality of pilot signals have variable pilot signal parameters selected from a group of parameters that includes pilot power and pilot spacing with respect to adjacent pilots, and the transmitter is further adapted to transmit the wireless signal over a wireless communication channel. An embodiment further includes a receiver receiving a channel-affected version of the wireless signal, and producing a corrected signal by applying corrections to the received signal based on estimated channel perturbations within the received signal, where the estimated channel perturbations are determined based on the plurality of pilot signals. The receiver also produces an output data symbol from the corrected signal.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method for wirelessly communicating a signal, the method comprising the steps of:
generating a wireless signal that includes a guard band, data represented within a plurality of data-bearing subcarriers, and a plurality of pilot signals represented within a plurality of pilot subcarriers, wherein the data-bearing subcarriers and the pilot subcarriers are positioned within an in-band region, each of the pilot subcarriers is separated from each other pilot subcarrier by at least one data-bearing subcarrier, the plurality of pilot subcarriers are unevenly spaced across the in-band region, and the plurality of pilot subcarriers are symmetric with respect to a center of the in-band region; and transmitting the wireless signal over a wireless communication channel.

2. The method of claim 1, wherein the wireless signal is an orthogonal frequency division multiplexed (OFDM) signal.

3. The method of claim 1, wherein the wireless signal is an orthogonal frequency division multiple access (OFDMA) signal.

4. The method of claim 1, wherein the wireless signal is wideband code division multiple access (W-CDMA) signal.

5. A method for wirelessly communicating a signal, the method comprising the steps of:
    generating a wireless signal that includes a guard band, data represented within a plurality of data-bearing subcarriers, and a plurality of pilot signals represented within a plurality of pilot subcarriers, wherein the data-bearing subcarriers and the pilot subcarriers are within an in-band region, and wherein the pilot signals have unequal power in that a power contained within one or more first pilot signals of the plurality of pilot signals is substantially different from a power contained within one or more second pilot signals of the plurality of pilot signals; and
    transmitting the wireless signal over a wireless communication channel, including simultaneously transmitting the pilot signals with unequal power over the wireless communication channel.

6. A method for wirelessly communicating a signal, the method comprising the steps of:
    generating a wireless signal that includes a guard band, data represented within a plurality of data-bearing subcarriers, and a plurality of pilot signals represented within a plurality of pilot subcarriers, wherein the data-bearing subcarriers and the pilot subcarriers are within an in-band region, and wherein a first power contained within one or more first pilot signals of the plurality of pilot signals is substantially different from a second power contained within one or more second pilot signals of the plurality of pilot signals; and
    transmitting the wireless signal over a wireless communication channel, including simultaneously transmitting the pilot signals with the first and second powers over the wireless communication channel.

7. A method for wirelessly communicating a signal, the method comprising the steps of:
    generating a wireless signal that includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, wherein subcarrier indices for the plurality of pilot subcarriers are unevenly-spaced, and are determined using a cubic parameterization of the pilot subcarriers in conjunction with a convex optimization algorithm to produce pilot signals that result in near-optimal channel estimate mean square error (MSE) performance; and
    transmitting the wireless signal over a wireless communication channel.

8. The method of claim 7, wherein the wireless signal is an orthogonal frequency division multiplexed (OFDM) signal.

9. The method of claim 7, wherein the wireless signal is an orthogonal frequency division multiple access (OFDMA) signal.

10. The method of claim 7, wherein the wireless signal is wideband code division multiple access (W-CDMA) signal.

11. A method for wirelessly communicating a signal, the method comprising the steps of:
    generating a wireless signal that includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, and wherein generating the wireless signal comprises:
        combining a plurality of phase shifted input data signals with a plurality of synchronization/pilot sequences to produce a plurality of combined signals, wherein the plurality of synchronization/pilot sequences include the plurality of pilot signals,
        performing frequency domain-to-time domain transformations of the combined signals to produce a plurality of candidate signals,
        determining peak-to-average ratios for at least some of the plurality of candidate signals,
        identifying a selected signal from the plurality of candidate signals based on the peak-to-average ratios, and
        further processing the selected signal to generate the wireless signal; and
    transmitting the wireless signal over a wireless communication channel.

12. The method of claim 11, wherein identifying the selected signal comprises the step of:
    identifying the selected signal as a signal of the plurality of candidate signals that has a lowest peak-to-average ratio of the peak-to-average ratios.

13. The method of claim 11, wherein the set of synchronization/pilot sequences includes synchronization/pilot sequences generated by generating a plurality of candidate synchronization/pilot sequences, wherein each candidate synchronization/pilot sequence of the plurality is generated using a different random phase, performing a plurality of correlations among the candidate synchronization/pilot sequences to generate a plurality of correlation values, determining a plurality of permutations of the candidate synchronization/pilot sequences, wherein each permutation of the plurality of permutations includes a different set of candidate synchronization/pilot sequences, and wherein each permutation includes a number, D, of candidate synchronization/pilot sequences, and identifying a selected permutation from the plurality of permutations, wherein the selected permutation corresponds to the set of synchronization/pilot sequences being generated.

14. A method comprising the steps of:
    receiving a received signal from a wireless communication channel, wherein the received signal represents a channel-affected version of a wireless signal that was transmitted by a transmitter, and wherein the wireless signal includes a guard band, data represented within a plurality of data-bearing subcarriers, and a plurality of pilot signals represented within a plurality of pilot subcarriers, wherein the data-bearing subcarriers and the pilot subcarriers are within an in-band region, and wherein a power contained within one or more first pilot signals of the plurality of pilot signals is substantially different from a power contained within one or more second pilot signals of the plurality of pilot signals, and wherein the one or more first pilot signals and the one or more second pilot signals are simultaneously received;
    producing a corrected signal by applying corrections to the received signal based on estimated channel perturbations within the received signal, which estimated channel perturbations are determined based on the plurality of pilot signals; and producing an output data symbol from the corrected signal.

15. A method comprising the steps of:

receiving a received signal from a wireless communication channel, wherein the received signal represents a channel-affected version of a wireless signal that was transmitted by a transmitter, and wherein the wireless signal includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, wherein the wireless signal that was transmitted by the transmitter represents a signal selected by the transmitter from a plurality of candidate signals, and the received signal includes a combination of a phase shifted input data signal with a synchronization/pilot sequence, and wherein the plurality of pilot signals form a portion of the synchronization/pilot sequence;

determining an estimate of a selective mapping (SLM) index, which identifies the synchronization/pilot sequence from a plurality of synchronization/pilot sequences;

producing a corrected signal by applying corrections to the received signal based on estimated channel perturbations within the received signal, which estimated channel perturbations are determined based on the plurality of pilot signals, wherein producing the corrected signal is performed by applying the corrections to the received signal based the estimated channel perturbations within the received signal, wherein the estimated channel perturbations are determined based on the estimate of the SLM index and the plurality of pilot signals; and producing an output data symbol from the corrected signal.

16. A method comprising the steps of:

receiving a received signal from a wireless communication channel, wherein the received signal represents a channel-affected version of a wireless signal that was transmitted by a transmitter, and wherein the wireless signal includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, wherein subcarrier indices for the plurality of pilot subcarriers are unevenly-spaced, and are determined using a cubic parameterization of the pilot subcarriers in conjunction with a convex optimization algorithm to produce pilot signals that result in near-optimal channel estimate mean square error (MSE) performance;

producing a corrected signal by applying corrections to the received signal based on estimated channel perturbations within the received signal, which estimated channel perturbations are determined based on the plurality of pilot signals; and producing an output data symbol from the corrected signal.

17. A method comprising the steps of:

receiving a received signal from a wireless communication channel, wherein the received signal represents a channel-affected version of a wireless signal that was transmitted by a transmitter, and wherein the wireless signal includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, wherein the wireless signal is an orthogonal frequency division multiplexed (OFDM) signal;

producing a corrected signal by applying corrections to the received signal based on estimated channel perturbations within the received signal, which estimated channel perturbations are determined based on the plurality of pilot signals; and producing an output data symbol from the corrected signal.

18. A method comprising the steps of:

receiving a received signal from a wireless communication channel, wherein the received signal represents a channel-affected version of a wireless signal that was transmitted by a transmitter, and wherein the wireless signal includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, wherein the wireless signal is an orthogonal frequency division multiple access (OFDMA) signal;

producing a corrected signal by applying corrections to the received signal based on estimated channel perturbations within the received signal, which estimated channel perturbations are determined based on the plurality of pilot signals; and producing an output data symbol from the corrected signal.

19. A method comprising the steps of:

receiving a received signal from a wireless communication channel, wherein the received signal represents a channel-affected version of a wireless signal that was transmitted by a transmitter, and wherein the wireless signal includes a guard band, data represented within a plurality of data-bearing subcarriers, and a plurality of pilot signals represented within a plurality of pilot subcarriers, wherein the plurality of pilot signals have variable pilot signal parameters selected from a group of parameters that includes pilot power and pilot spacing with respect to adjacent pilots, wherein the wireless signal is wideband code division multiple access (W-CDMA) signal;

producing a corrected signal by applying corrections to the received signal based on estimated channel perturbations within the received signal, which estimated channel perturbations are determined based on the plurality of pilot signals; and producing an output data symbol from the corrected signal.

20. A method for determining variable pilot signal parameters for a plurality of pilot signals of a wireless signal that includes a guard band and a passband, wherein the passband includes data represented within a plurality of data-bearing subcarriers and the passband also includes the plurality of pilot signals represented within a plurality of pilot subcarriers, and wherein the variable pilot signal parameters are selected from a group of parameters that includes pilot power and pilot spacing with respect to adjacent pilots, the method comprising:

performing a grid search over a domain of a first pilot position variable and a second pilot position variable, wherein the first pilot position variable determines positions of the pilot signals on two edges of the passband, and the second pilot position variable is related to how the pilot spacing changes across the passband; and setting a minimizing parameter to $K_p^{(i)}$, where i corresponds to an iteration of the grid search having a minimum mean square error, and $K_p^{(i)}$ is a pilot subcarrier index.

21. The method of claim 20, wherein the wireless signal is an orthogonal frequency division multiplexed (OFDM) signal.

22. The method of claim 20, wherein the wireless signal is an orthogonal frequency division multiple access (OFDMA) signal.

23. The method of claim 20, wherein the wireless signal is wideband code division multiple access (W-CDMA) signal.

24. A system comprising:
a transmitter adapted to generate a wireless signal includes a guard band, data represented within a plurality of data-bearing subcarriers, and a plurality of pilot signals represented within a plurality of pilot subcarriers, wherein the data-bearing subcarriers and the pilot subcarriers are within an in-band region, and wherein a first power contained within one or more first pilot signals of the plurality of pilot signals is substantially different from a second power contained within one or more second pilot signals of the plurality of pilot signals, and the transmitter is further adapted to transmit the wireless signal over a wireless communication channel, including simultaneously transmitting the pilot signals with the first and second powers over the wireless communication channel.

25. The system of claim 24, wherein the transmitter is a wireless communication device selected from a group that includes a cellular telephone, a radio, an unmanned autonomous vehicle, a one-way pager, a two-way pager, a personal data assistant, a computer, a base station, a wireless transmitter, and a wireless transceiver.

26. The system of claim 24, further comprising:
a receiver adapted to receive a received signal from the wireless communication channel, wherein the received signal represents a channel-affected version of the wireless signal that was transmitted by the transmitter, to produce a corrected signal by applying corrections to the received signal based on estimated channel perturbations within the received signal, which estimated channel perturbations are determined based on the plurality of pilot signals, and to produce an output data symbol from the corrected signal.

27. The system of claim 26, wherein the receiver is a wireless communication device selected from a group that includes a cellular telephone, a radio, an unmanned autonomous vehicle, a one-way pager, a two-way pager, a personal data assistant, a computer, a base station, a wireless transmitter, and a wireless transceiver.

28. The system of claim 24, wherein the system is a multi-carrier communication system selected from a group that includes a multi-carrier based, ultra-wideband system, an orthogonal frequency division multiplexing (OFDM) system, an orthogonal frequency division multiple access (OFDMA) system, a multi-carrier code division multiple access (MC-CDMA) system, a wideband code division multiple access (W-CDMA) system, a wireless local area network (WLAN), a digital video broadcast (DVB) system, a digital audio broadcast (DAB) system, a broadband radio access network (BRAN), a WiMAX (Worldwide Interoperability for Microwave Access) system, a single-input single-output (SISO) system, a multiple-input multiple output (MIMO) system, a single-input multiple-output (SIMO) system, and a multiple-input single-output (MISO) system.

\* \* \* \* \*